(12) United States Patent
Iwane

(10) Patent No.: US 12,058,463 B2
(45) Date of Patent: Aug. 6, 2024

(54) PHOTOELECTRIC CONVERSION DEVICE AND METHOD OF DRIVING PHOTOELECTRIC CONVERSION DEVICE

(71) Applicant: CANON KABUSHIKI KAISHA, Tokyo (JP)

(72) Inventor: Masaaki Iwane, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 64 days.

(21) Appl. No.: 17/831,789

(22) Filed: Jun. 3, 2022

(65) Prior Publication Data

US 2022/0408050 A1    Dec. 22, 2022

(30) Foreign Application Priority Data

Jun. 16, 2021   (JP) ................. 2021-099868

(51) Int. Cl.
*H04N 25/76* (2023.01)
*H04N 25/75* (2023.01)
*H04N 25/767* (2023.01)

(52) U.S. Cl.
CPC .......... *H04N 25/767* (2023.01); *H04N 25/75* (2023.01)

(58) Field of Classification Search
CPC .............................. H04N 25/767; H04N 25/75
See application file for complete search history.

(56) References Cited

U.S. PATENT DOCUMENTS

| | | | |
|---|---|---|---|
| 6,534,336 B1 | 3/2003 | Iwane | |
| 7,935,995 B2 | 5/2011 | Watanabe | |
| 8,111,311 B2 | 2/2012 | Iwane | |
| 8,139,133 B2 | 3/2012 | Iwane | |
| 8,222,682 B2 | 7/2012 | Watanabe | |
| 8,325,260 B2 | 12/2012 | Yamazaki | |
| 8,345,137 B2 | 1/2013 | Shinohara | |
| 8,810,706 B2 | 8/2014 | Yamazaki | |
| 9,001,249 B2 | 4/2015 | Iwane | |
| 9,053,996 B2 | 6/2015 | Iwane | |
| 9,232,164 B2 | 1/2016 | Minowa | |

(Continued)

FOREIGN PATENT DOCUMENTS

| | | |
|---|---|---|
| JP | 2008-523772 A | 7/2008 |
| JP | 2009-213012 A | 9/2009 |
| JP | 2010-166528 A | 7/2010 |

*Primary Examiner* — Twyler L Haskins
*Assistant Examiner* — Fayez A Bhuiyan
(74) *Attorney, Agent, or Firm* — VENABLE LLP

(57) ABSTRACT

Provided is a photoelectric conversion device including a pixel array that includes pixels forming columns and is arranged in a substrate, first signal lines each transmitting a signal output from a pixel of a corresponding column, an analog circuit arranged in the substrate and configured to process signals from the pixels, second signal lines transmitting signals from the pixels to the analog circuit on a column basis, a switch configured to change a combination of connections between the first signal lines and the second signal lines, and a shift register arranged in the substrate, including a flip-flop, and configured to control the switch. In a plan view with respect to the substrate, the shift register is arranged between the pixel array and the analog circuit. In the plan view, the switch and the flip-flop are arranged in a direction different from a direction in which the first signal lines extend.

23 Claims, 20 Drawing Sheets

(56) References Cited

U.S. PATENT DOCUMENTS

| | | |
|---|---|---|
| 9,497,403 B2 | 11/2016 | Iwane |
| 9,627,423 B2 | 4/2017 | Takada |
| 9,948,877 B2 | 4/2018 | Iwane |
| 9,966,398 B2 | 5/2018 | Nakamura |
| 10,021,328 B2 | 7/2018 | Takada |
| 10,298,867 B2 | 5/2019 | Takada |
| 10,404,933 B2 | 9/2019 | Iwane |
| 10,811,448 B2 | 10/2020 | Nakamura |
| 2006/0125940 A1 | 6/2006 | Tinkler et al. |
| 2010/0182473 A1 | 7/2010 | Nakamura |
| 2014/0340555 A1 | 11/2014 | Iwane |
| 2021/0289195 A1* | 9/2021 | Iwane ................. H04N 25/701 |

* cited by examiner

FIG. 7A

NORMAL

| PIXEL COLUMN SIGNAL LINE | PVL0 | PVL1 | PVL2 |
|---|---|---|---|
| PERIPHERAL CIRCUIT COLUMN SIGNAL LINE | RVL0 | RVL1 | RVL2 |

FIG. 7B

COLUMN CIRCUIT CONNECTED TO RVL1 IS DEFECTIVE

| PIXEL COLUMN SIGNAL LINE | PVL0 | PVL1 | PVL2 |
|---|---|---|---|
| PERIPHERAL CIRCUIT COLUMN SIGNAL LINE | RVL0 | RVL2 | RVL3 |

FIG. 11A

ALL-PIXEL READOUT / NORMAL

| PIXEL COLUMN SIGNAL LINE | PVL0 | PVL1 | PVL2 | PVL3 | PVL4 | PVL5 | PVL6 | PVL7 | PVL8 | PVL9 | PVL10 | PVL11 |
| --- | --- | --- | --- | --- | --- | --- | --- | --- | --- | --- | --- | --- |
| PERIPHERAL CIRCUIT COLUMN SIGNAL LINE | RVL0 | RVL1 | RVL2 | RVL3 | RVL4 | RVL5 | RVL6 | RVL7 | RVL8 | RVL9 | RVL10 | RVL11 |

FIG. 11B

ALL-PIXEL READOUT / CURRENT SOURCE Ib4 IS DEFECTIVE

| PIXEL COLUMN SIGNAL LINE | PVL0 | PVL1 | PVL2 | PVL3 | PVL4 | PVL5 | PVL6 | PVL7 | PVL8 | PVL9 | PVL10 | PVL11 |
| --- | --- | --- | --- | --- | --- | --- | --- | --- | --- | --- | --- | --- |
| PERIPHERAL CIRCUIT COLUMN SIGNAL LINE | RVL0 | RVL1 | RVL2 | RVL3 | RVL8 | RVL9 | RVL10 | RVL11 | RVL12 | RVL13 | RVL14 | RVL15 |

FIG. 11C

FOUR-COLUMN ANALOG SIGNAL AVERAGING / NORMAL

| PIXEL COLUMN SIGNAL LINE | PVL0 | PVL1 | PVL2 | PVL3 | PVL4 | PVL5 | PVL6 | PVL7 | PVL8 | PVL9 | PVL10 | PVL11 |
| --- | --- | --- | --- | --- | --- | --- | --- | --- | --- | --- | --- | --- |
| PERIPHERAL CIRCUIT COLUMN SIGNAL LINE | RVL0 | RVL0 | RVL0 | RVL0 | RVL4 | RVL4 | RVL4 | RVL4 | RVL8 | RVL8 | RVL8 | RVL8 |

FIG. 11D

FOUR-COLUMN ANALOG SIGNAL AVERAGING / CURRENT SOURCE Ib4 IS DEFECTIVE

| PIXEL COLUMN SIGNAL LINE | PVL0 | PVL1 | PVL2 | PVL3 | PVL4 | PVL5 | PVL6 | PVL7 | PVL8 | PVL9 | PVL10 | PVL11 |
| --- | --- | --- | --- | --- | --- | --- | --- | --- | --- | --- | --- | --- |
| PERIPHERAL CIRCUIT COLUMN SIGNAL LINE | RVL0 | RVL0 | RVL0 | RVL0 | RVL8 | RVL8 | RVL8 | RVL8 | RVL12 | RVL12 | RVL12 | RVL12 |

FIG. 15

| | FF0 OUTPUT | FF1 OUTPUT | PVL0(G) | PVL1(B) | PVL2(G) | PVL3(B) |
|---|---|---|---|---|---|---|
| NORMAL | 0 | 0 | RVL0 | RVL1 | RVL2 | RVL3 |
| | 0 | 1 | RVL2 | RVL3 | RVL0 | RVL1 |
| RVL1 IS DEFECTIVE (1) | 1 | 0 | RVL1 | RVL0 | RVL3 | RVL2 |
| RVL1 IS DEFECTIVE (2) | 1 | 1 | RVL3 | RVL2 | RVL1 | RVL0 |

FIG. 17

| ΦC0 | ΦC1 | ΦC2 | PVL0 | PVL1 | PVL2 | PVL3 | PVL4 | PVL5 | PVL6 | PVL7 |
|---|---|---|---|---|---|---|---|---|---|---|
| 0 | 0 | 0 | RVL0 | RVL1 | RVL2 | RVL3 | RVL4 | RVL5 | RVL6 | RVL7 |
| 1 | 0 | 0 | RVL1 | RVL0 | RVL3 | RVL2 | RVL5 | RVL4 | RVL7 | RVL6 |
| 0 | 1 | 0 | RVL2 | RVL3 | RVL0 | RVL1 | RVL6 | RVL7 | RVL4 | RVL5 |
| 1 | 1 | 0 | RVL3 | RVL2 | RVL1 | RVL0 | RVL7 | RVL6 | RVL5 | RVL4 |
| 0 | 0 | 1 | RVL4 | RVL5 | RVL6 | RVL7 | RVL0 | RVL1 | RVL2 | RVL3 |
| 1 | 0 | 1 | RVL5 | RVL4 | RVL7 | RVL6 | RVL1 | RVL0 | RVL3 | RVL2 |
| 0 | 1 | 1 | RVL6 | RVL7 | RVL4 | RVL5 | RVL2 | RVL3 | RVL0 | RVL1 |
| 1 | 1 | 1 | RVL7 | RVL6 | RVL5 | RVL4 | RVL3 | RVL2 | RVL1 | RVL0 |

PHOTOELECTRIC CONVERSION DEVICE AND METHOD OF DRIVING PHOTOELECTRIC CONVERSION DEVICE

BACKGROUND OF THE INVENTION

Field of the Invention

The present disclosure relates to a photoelectric conversion device and a method of driving the photoelectric conversion device.

Description of the Related Art

Japanese Patent Application Laid-Open No. 2009-213012 discloses a solid-state imaging device in which an analog circuit for processing an analog signal from a pixel array unit has a redundant configuration. Thus, the solid-state imaging device disclosed in Japanese Patent Application Laid-Open No. 2009-213012 has improved yield.

In the circuit configuration of the photoelectric conversion device described in Japanese Patent Application Laid-Open No. 2009-213012, an occupied area of a circuit on the semiconductor substrate may increase.

SUMMARY OF THE INVENTION

Accordingly, an object of the present disclosure is to provide a photoelectric conversion device and a driving method of the photoelectric conversion device, which can reduce an occupied area of a circuit.

According to an aspect of the present disclosure, there is provided a photoelectric conversion device including a substrate, a pixel array that includes a plurality of pixels forming a plurality of columns and is arranged in the substrate, a plurality of first signal lines each transmitting a signal output from a pixel of a corresponding column, an analog circuit arranged in the substrate and configured to process signals from the plurality of pixels, a plurality of second signal lines transmitting signals from the plurality of pixels to the analog circuit on a column basis, a switch configured to change a combination of connections between the plurality of first signal lines and the plurality of second signal lines, and a shift register arranged in the substrate, including a flip-flop, and configured to control the switch. In a plan view with respect to the substrate, the shift register is arranged between the pixel array and the analog circuit. In the plan view with respect to the substrate, the switch and the flip-flop are arranged in a direction different from a direction in which the plurality of first signal lines extend.

According to another aspect of the present disclosure, there is provided a photoelectric conversion device including a pixel array that includes a plurality of pixels forming a plurality of columns, a plurality of first signal lines each transmitting a signal output from a pixel of a corresponding column, an analog circuit configured to process signals from the plurality of pixels, a plurality of second signal lines transmitting signals from the plurality of pixels to the analog circuit on a column basis, and a switch configured to change a combination of connections between the plurality of first signal lines and the plurality of second signal lines. The switch is controlled such that a combination of connections of the plurality of first signal lines and the plurality of second signal lines is changed within a reading period of one frame.

According to another aspect of the present disclosure, there is provided a method of driving a photoelectric conversion device. The photoelectric conversion device includes a substrate, a pixel array that includes a plurality of pixels forming a plurality of columns and is arranged in the substrate, a plurality of first signal lines each transmitting a signal output from a pixel of a corresponding column, an analog circuit arranged in the substrate and configured to process signals from the plurality of pixels, a plurality of second signal lines transmitting signals from the plurality of pixels to the analog circuit on a column basis, a switch configured to change a combination of connections between the plurality of first signal lines and the plurality of second signal lines, and a shift register arranged in the substrate and including a flip-flop. In a plan view with respect to the substrate, the shift register is arranged between the pixel array and the analog circuit. In the plan view with respect to the substrate, the switch and the flip-flop are arranged in a direction different from a direction in which the plurality of first signal lines extend. The method includes controlling the switch by the shift register to change a combination of connections of the plurality of first signal lines and the plurality of second signal lines.

According to another aspect of the present disclosure, there is provided a method of driving a photoelectric conversion device. The photoelectric conversion device includes a pixel array that includes a plurality of pixels forming a plurality of columns, a plurality of first signal lines each transmitting a signal output from a pixel of a corresponding column, an analog circuit configured to process signals from the plurality of pixels, a plurality of second signal lines transmitting signals from the plurality of pixels to the analog circuit on a column basis, and a switch configured to change a combination of connections between the plurality of first signal lines and the plurality of second signal lines. The method includes controlling the switch to change a combination of connections of the plurality of first signal lines and the plurality of second signal lines within a reading period of one frame.

Further features of the present invention will become apparent from the following description of exemplary embodiments with reference to the attached drawings.

BRIEF DESCRIPTION OF THE DRAWINGS

FIGS. 7A and 7B are tables illustrating connections between pixel column signal lines and peripheral circuit column signal lines according to the first embodiment.

FIGS. 11A, 11B, 11C, and 11D are tables illustrating connections between pixel column signal lines and peripheral circuit column signal lines according to the second embodiment.

FIG. 15 is a table illustrating connections between pixel column signal lines and peripheral circuit column signal lines according to the fourth embodiment.

FIG. 17 is a table illustrating connections between pixel column signal lines and peripheral circuit column signal lines according to the fifth embodiment.

DESCRIPTION OF THE EMBODIMENTS

Figure 1:
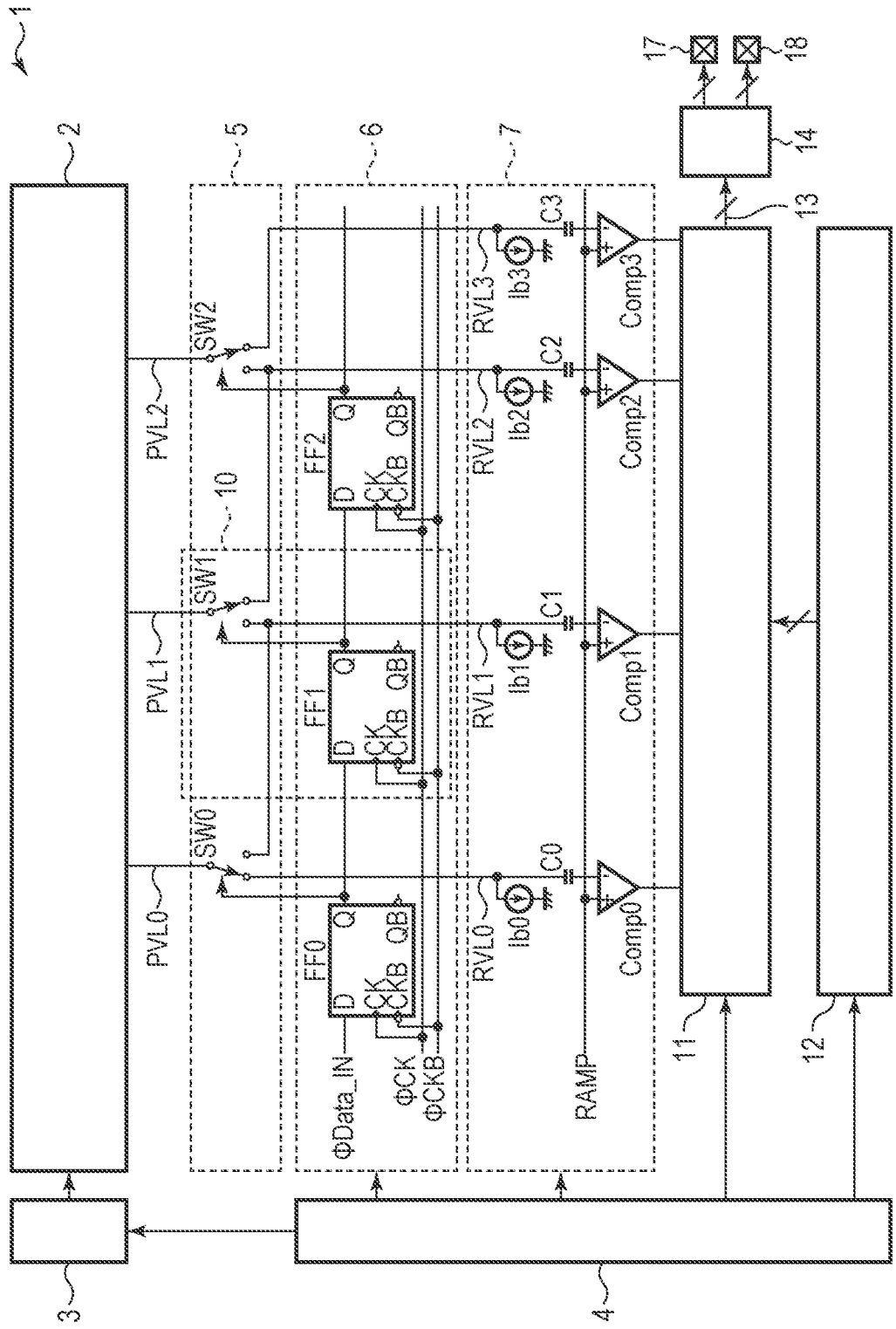
FIG. 1 is a block diagram of a photoelectric conversion device according to a first embodiment.

Preferred embodiments of the present invention will now be described in detail in accordance with the accompanying drawings. In the drawings, the same or corresponding elements are denoted by the same reference numerals, and the description thereof may be omitted or simplified.

First Embodiment

Figure 2:
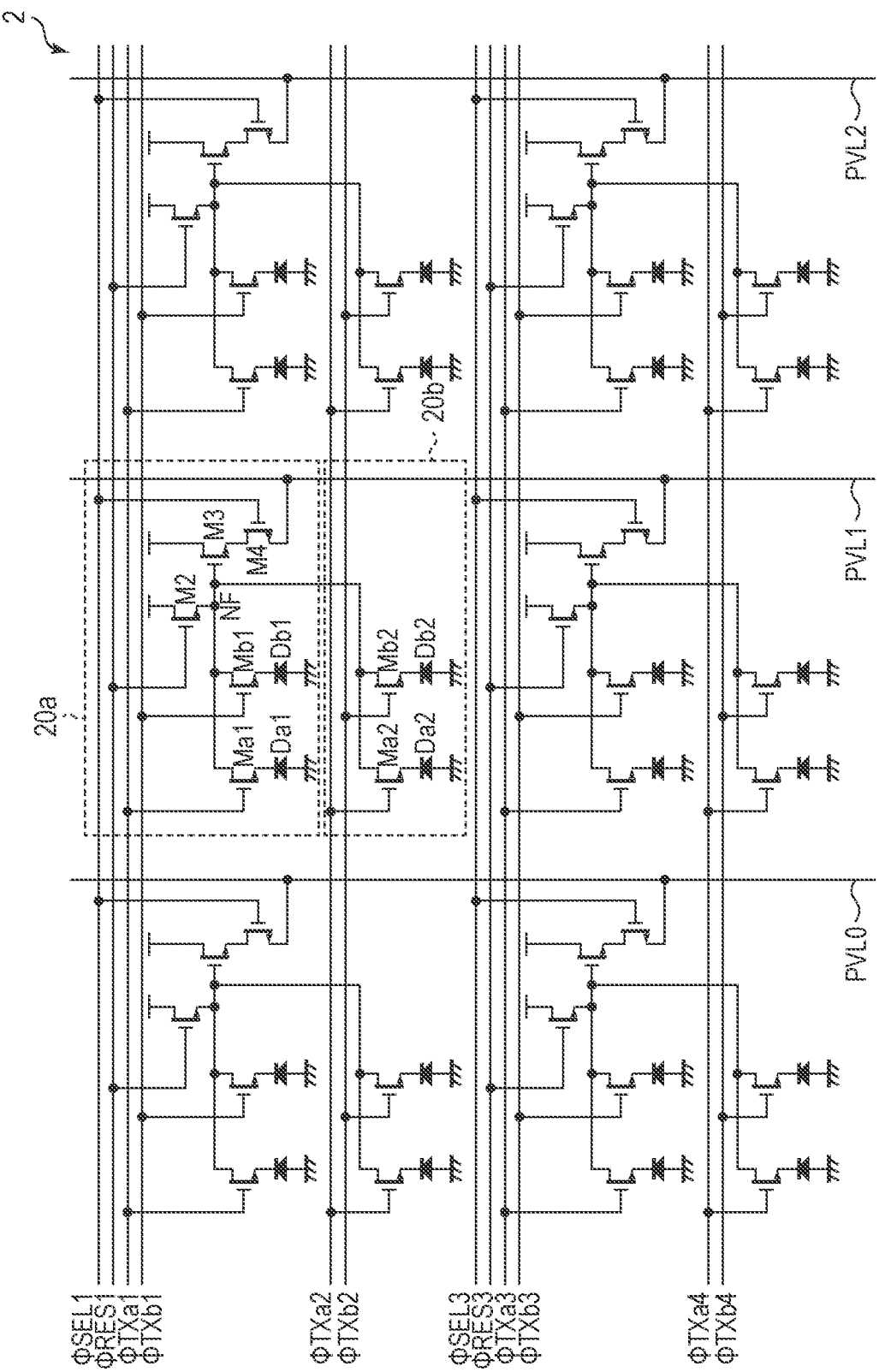
FIG. 2 is a circuit diagram of a pixel array according to the first embodiment.
Figure 3:
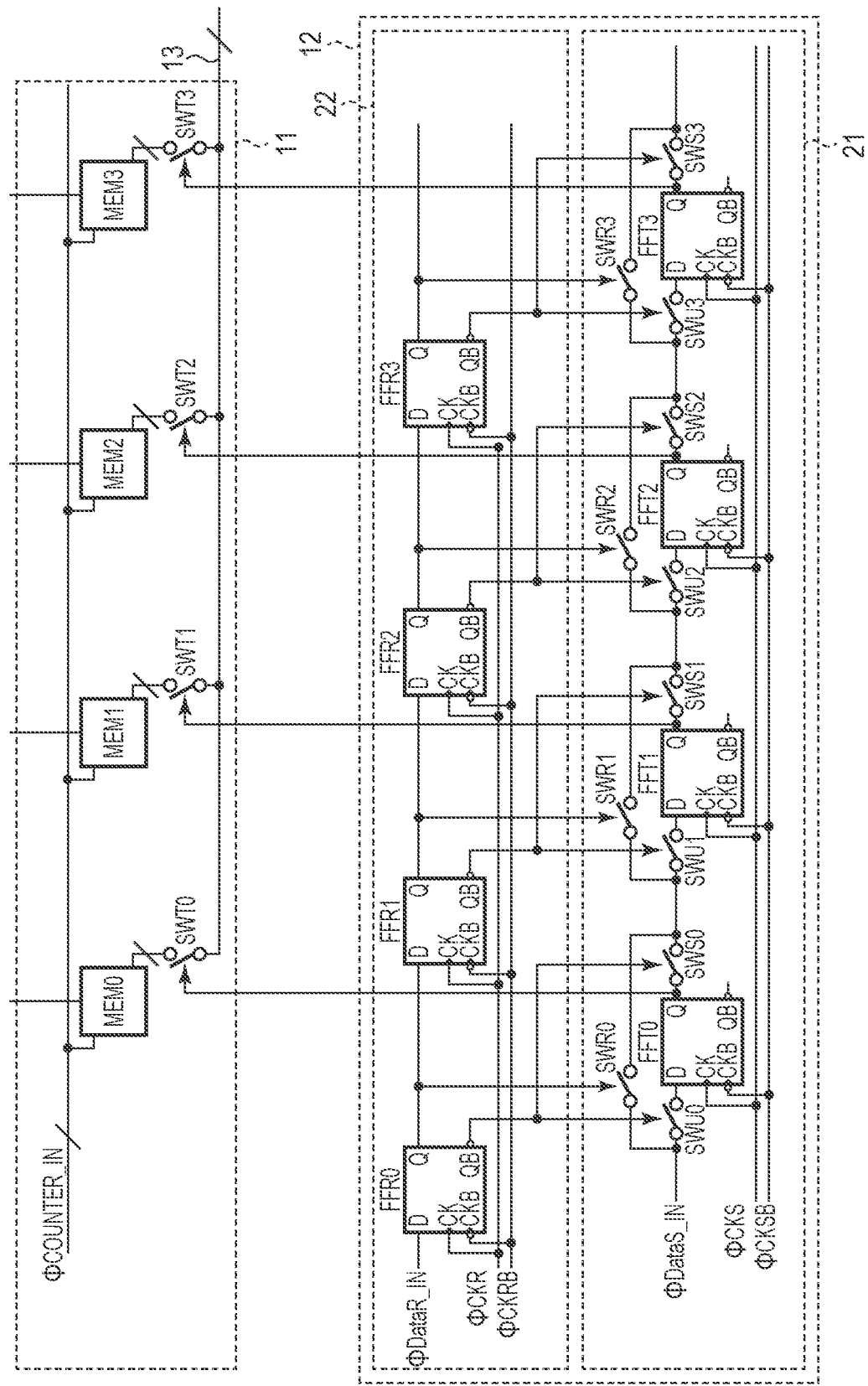
FIG. 3 is a circuit diagram of a digital line memory and a horizontal scanning circuit according to the first embodiment.
Figure 4:
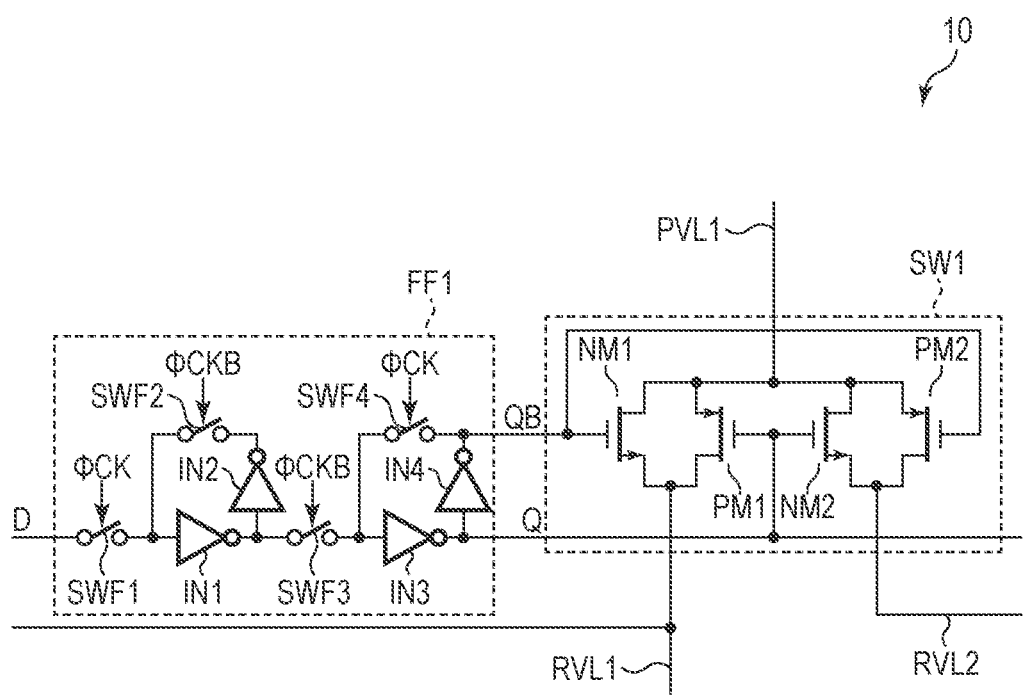
FIG. 4 is a circuit diagram of a selection unit according to the first embodiment.
Figure 5:
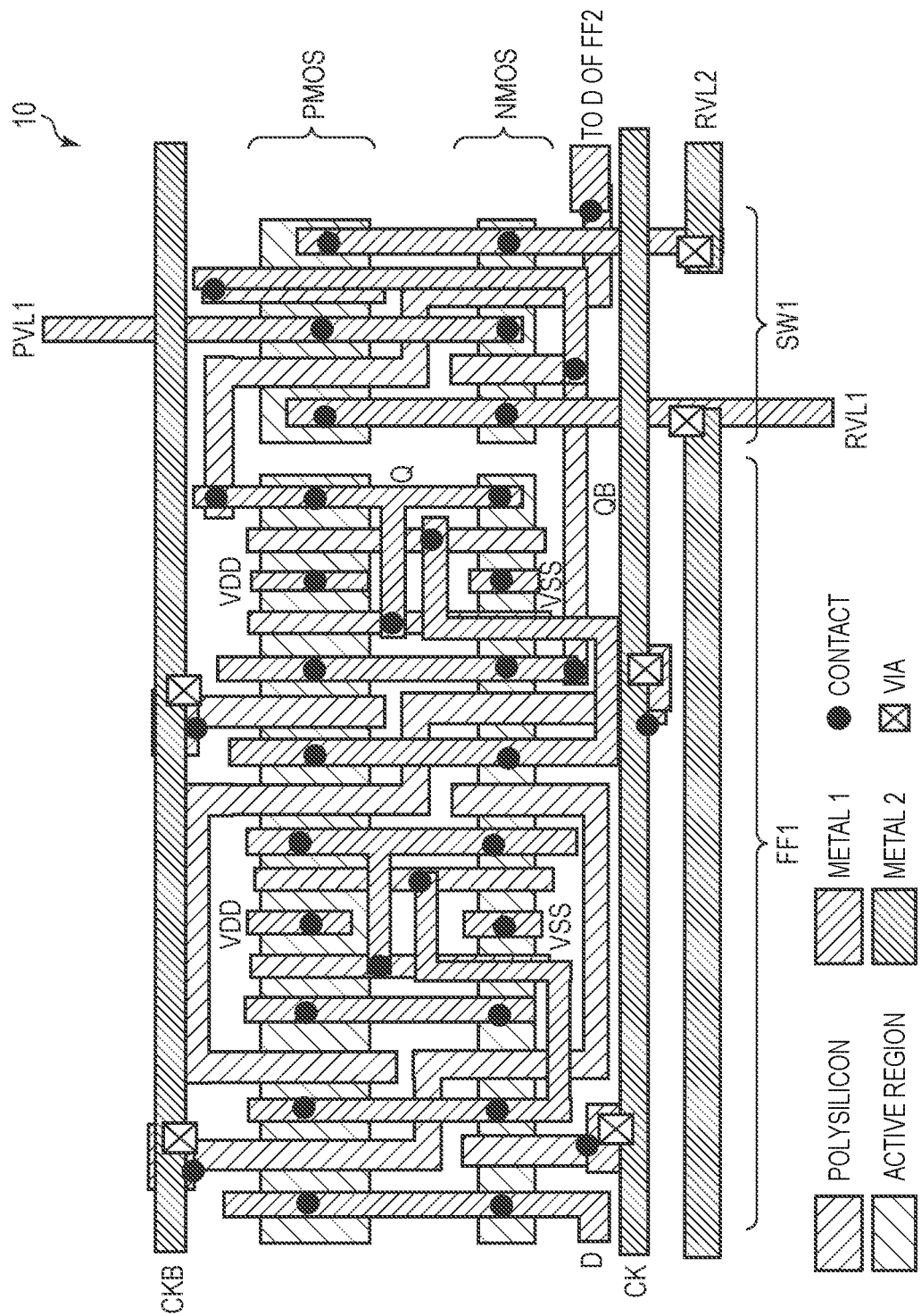
FIG. 5 is a layout diagram of a selection unit according to the first embodiment.

FIG. 1 is a block diagram of a photoelectric conversion device according to the present embodiment. FIG. 2 is a circuit diagram of the pixel array according to the present embodiment. FIG. 3 is a circuit diagram of a digital line memory and a horizontal scanning circuit according to the present embodiment. FIG. 4 is a circuit diagram of a selection unit according to the present embodiment. FIG. 5 is a layout diagram of a selection unit according to the present embodiment. A configuration of a photoelectric conversion device according to the present embodiment will be described with reference to FIGS. 1 to 5.

As illustrated in FIG. 1, the photoelectric conversion device 1 includes a pixel array 2, a vertical scanning circuit 3, a control circuit 4, a switch group 5, a shift register 6, an analog peripheral circuit 7, a digital line memory 11, a horizontal scanning circuit 12, an output processing circuit 14, and output terminals 17 and 18. These circuits constituting the photoelectric conversion device 1 can be formed in a semiconductor substrate such as silicon. The photoelectric conversion device 1 of the present embodiment is assumed to be an imaging device that acquires an image, but the present invention is not limited to this. For example, the photoelectric conversion device 1 may be a focus detection device, a distance measuring device, a time-of-flight (TOF) camera, or the like.

The control circuit 4 controls the vertical scanning circuit 3, the shift register 6, the analog peripheral circuit 7, the digital line memory 11, and the horizontal scanning circuit 12 by supplying control signals thereto. The pixel array 2 has a plurality of pixels arranged to form a plurality of rows and a plurality of columns. Typically, the number of rows and the number of columns of the pixel array 2 may be thousands, but in the present embodiment, the number of rows and the number of columns of the pixel array 2 are assumed to be 4 rows×3 columns for simplicity of description.

The vertical scanning circuit 3 is a scanning circuit that supplies a control signal for controlling transistors included in each pixel of the pixel array 2 to on (conductive state) or off (nonconductive state) via a control signal line provided in each row of the pixel array 2. The vertical scanning circuit 3 may be configured by a logic circuit such as a shift register or an address decoder. Here, since the control signal supplied to the pixel array 2 may include a plurality of types of control signals, the control signal line of each row may be configured as a set of a plurality of driving wirings. Pixel column signal lines PVL0, PVL1, and PVL2 (first signal lines) are provided in each column of the pixel array 2, and signals from the pixels are read out to the pixel column signal lines PVL0, PVL1, and PVL2 for each column. The pixel array 2 can output a signal based on the reset state of the pixel and a signal generated by photoelectric conversion in the pixel.

Here, the configuration of the pixel array 2 will be described in more detail with reference to FIG. 2. The pixel array 2 has a repetitive arrangement in which the pixels 20a and the pixels 20b form one block. Structures of the pixel 20a and the pixel 20b will be described. The pixel 20a includes photoelectric conversion units Da1 and Db1, transfer transistors Ma1 and Mb1, a reset transistor M2, an amplifier transistor M3, and a selection transistor M4. The pixel 20b includes photoelectric conversion units Da2 and Db2 and transfer transistors Ma2 and Mb2.

These transistors are configured by MOS transistors each having a gate as a control electrode. Control signals φTXa1, φTXb1, φRES1, and φSEL1 for controlling these transistors are input from the vertical scanning circuit 3 to gates of the transfer transistors Ma1 and Mb1, the reset transistor M2, and the selection transistor M4 via control signal lines, respectively. Control signals φTXa2 and φTXb2 for controlling these transistors are input to the gates of the transfer transistors Ma2 and Mb2 from the vertical scanning circuit 3 via control signal lines, respectively. The last numerical value of these control signals indicates the row number of the pixels to which these signals are input.

The photoelectric conversion units Da1, Db1, Da2, and Db2 are photoelectric conversion elements that generate charges corresponding to incident light by photoelectric conversion and accumulate the charges. The photoelectric conversion units Da1, Db1, Da2, and Db2 may be constituted by photodiodes formed in a semiconductor substrate. The anodes of the photodiodes constituting the photoelectric conversion units Da1, Db1, Da2, and Db2 are connected to a ground wiring to which a ground potential is supplied. The cathodes of the photodiodes constituting the photoelectric conversion units Da1, Db1, Da2, and Db2 are connected to the sources of the transfer transistors Ma1, Mb1, Ma2, and Mb2, respectively.

The drains of the transfer transistors Ma1, Mb1, Ma2, and Mb2, the source of the reset transistor M2, and the gate of the amplifier transistor M3 are connected to the floating diffusion NF. Each of the transfer transistors Ma1, Mb1, Ma2, and Mb2 is turned on to transfer the charges of the corresponding photoelectric conversion unit to the floating diffusion NF. Due to the capacitance of the floating diffusion NF, the potential of the floating diffusion NF changes according to the charges transferred from the photoelectric conversion units Da1, Db1, Da2, and Db2.

The drain of the reset transistor M2 and the drain of the amplifier transistor M3 are connected to a power supply wiring having a power supply potential. The source of the amplifier transistor M3 is connected to the drain of the selection transistor M4. The source of the selection transistor M4 is connected to the pixel column signal line PVL1. The amplifier transistor M3 forms a source follower circuit together with a current source (a current source Ib1 or a current source Ib2 described later) connected to the pixel column signal line PVL1. The source follower circuit outputs a signal based on the potential of the floating diffusion NF to the pixel column signal line PVL1 via the selection transistor M4. The reset transistor M2 is turned on to reset the potential of the floating diffusion NF.

The pixel 20a has a microlens and a color filter arranged on an optical path in which incident light is guided to the photoelectric conversion units Da1 and Db1. The microlens focuses incident light on the photoelectric conversion units Da1 and Db1. The color filter selectively transmits light of a predetermined color. That is, the photoelectric conversion units Da1 and Db1 have a common microlens. Thus, focus detection of the phase difference detection method based on a signal A based on the charges accumulated in the photoelectric conversion unit Da1 and a signal B based on the charges accumulated in the photoelectric conversion unit Db1 can be performed. Alternatively, an image may be generated using a signal A+B based on the sum of charges accumulated in the photoelectric conversion unit Da1 and charges accumulated in the photoelectric conversion unit Db1. Similarly, the pixel 20b has a microlens and a color filter arranged on an optical path in which the incident light is guided to the photoelectric conversion units Da2 and Db2.

In the present embodiment, the pixels 20a and 20b arranged in two different rows share one set of the reset transistor M2, the amplifier transistor M3, and the selection transistor M4. Thus, the number of transistors per pixel can be reduced. However, it is not essential to employ this pixel circuit configuration.

The switch group 5 includes a plurality of switches SW0, SW1, and SW2 respectively provided corresponding to the pixel column signal lines PVL0, PVL1, and PVL2. The shift register 6 is a circuit for controlling the switch group 5. The shift register 6 includes a plurality of flip-flops FF0, FF1, and FF2 respectively provided corresponding to the pixel column signal lines PVL0, PVL1, and PVL2. As illustrated in FIG. 1, the switch group 5 and the shift register 6 are arranged between the pixel array 2 and the analog peripheral circuit 7 in a plan view with respect to the semiconductor substrate.

Each of the plurality of switches SW0, SW1, and SW2 has one input terminal, two output terminals, and a control terminal. Each input terminal of the plurality of switches SW0, SW1, and SW2 is electrically connected to either a first output terminal (the left terminal in FIG. 1) or a second output terminal (the right terminal in FIG. 1) in response to a control signal input from the shift register 6 to the control terminal. In each switch, the input terminal and the first output terminal are connected when the control signal is at the low level, and the input terminal and the second output terminal are connected when the control signal is at the high level.

The photoelectric conversion device 1 includes a plurality of peripheral circuit column signal lines RVL0, RVL1, RVL2, and RVL3 (second signal lines) extending from the switch group 5 toward the analog peripheral circuit 7. An input terminal of the switch SW0 is connected to the pixel column signal line PVL0. A first output terminal of the switch SW0 is connected to the peripheral circuit column signal line RVL0, and a second output terminal of the switch SW0 is connected to the peripheral circuit column signal line RVL1. An input terminal of the switch SW1 is connected to the pixel column signal line PVL1. A first output terminal of the switch SW1 is connected to the peripheral circuit column signal line RVL1, and a second output terminal of the switch SW1 is connected to the peripheral circuit column signal line RVL2. An input terminal of the switch SW2 is connected to the pixel column signal line PVL2. A first output terminal of the switch SW2 is connected to the peripheral circuit column signal line RVL2, and a second output terminal of the switch SW2 is connected to the peripheral circuit column signal line RVL3. Thus, the switch group 5 is configured to connect one pixel column signal line to one of two peripheral circuit column signal lines.

Each of the flip-flops FF0, FF1, and FF2 has an input terminal D, clock terminals CK and CKB, and output terminals Q and QB. A clock signal φCK is input from the control circuit 4 to the clock terminals CK of the flip-flops FF0, FF1, and FF2. A clock signal φCKB, which is a signal obtained by logically inverting the clock signal φCK, is input to the clock terminals CKB from the control circuit 4.

A control signal φData_IN is input to the input terminal D of the flip-flop FF0 from the control circuit 4. The signal output from the output terminal Q of the flip-flop FF0 is input to the control terminal of the switch SW0 and the input terminal D of the flip-flop FF1. The signal output from the output terminal Q of the flip-flop FF1 is input to the control terminal of the switch SW1 and the input terminal D of the flip-flop FF2. The signal output from the output terminal Q of the flip-flop FF2 is input to the control terminal of the switch SW2. The output terminals QB of the flip-flops FF0, FF1, and FF2 are terminals that output signals obtained by logically inverting the signals of the output terminals Q. A signal from the output terminal QB can also be used to control the switch, but is not illustrated in FIG. 1.

The analog peripheral circuit 7 processes the signal output from the pixel array 2. The signal processing performed in the analog peripheral circuit 7 may include amplification of a signal, analog-to-digital conversion, and the like. The analog peripheral circuit 7 includes current sources Ib0, Ib1, Ib2, and Ib3, clamp capacitors C0, C1, C2, and C3, and comparators Comp0, Comp1, Comp2, and Comp3.

The current sources Ib0, Ib1, Ib2, and Ib3 are connected to peripheral circuit column signal lines RVL0, RVL1, RVL2, and RVL3, respectively. Each of the current sources Ib0, Ib1, Ib2, and Ib3 forms a source follower circuit together with the amplifier transistors M3 in the corresponding column.

A first terminal of the clamp capacitor C0 is connected to the peripheral circuit column signal line RVL0, and a second terminal of the clamp capacitor C0 is connected to the inverting input terminal of the comparator Comp0. Similarly, clamp capacitors C1, C2, and C3 are also connected between peripheral circuit column signal lines RVL1, RVL2, and RVL3 and comparators Comp1, Comp2, and Comp3, respectively. A reference signal RAMP is input to non-inverting input terminals of the comparators Comp0, Comp1, Comp2, and Comp3 from the control circuit 4 or a reference signal generation circuit (not illustrated). The reference signal RAMP is a signal whose potential varies with time, and may be, for example, a ramp signal. Each of the comparators Comp0, Comp1, Comp2, and Comp3 outputs a signal indicating a comparison result of the potential of the inverting input terminal and the potential of the non-inverting input terminal to the digital line memory 11. The digital line memory 11 has a memory corresponding to the comparator, and stores a digital signal corresponding to the time when the comparison result is inverted. By this process, analog-to-digital (AD) conversion of the signal from the pixel array 2 is performed. Thus, in the analog peripheral circuit 7, the analog circuit including the current source, the clamp capacitor, and the comparator is arranged corresponding to each of the peripheral circuit column signal lines. The analog peripheral circuit 7 performs processing such as AD conversion on signals from the pixels. The number of analog circuits and peripheral circuit column signal lines is larger than the number of pixel column signal lines, and the analog peripheral circuit 7 has a redundant configuration.

The horizontal scanning circuit 12 supplies a control signal for controlling switches connected to a plurality of memories in the digital line memory 11 to be turned on or off based on a control signal from the control circuit 4. Thus, signals are sequentially output from the plurality of memories to the output processing circuit 14 via a horizontal transfer line 13. The output processing circuit 14 may include a digital signal processor, a serializer, a low voltage differential signaling (LVDS) circuit, or the like. The digital signal processor performs signal processing such as correlated double sampling of the input signal. The serializer performs parallel-to-serial conversion on the input signal. The LVDS circuit outputs the processed signal to the outside by the LVDS method via the output terminals 17 and 18.

The configurations of the digital line memory 11 and the horizontal scanning circuit 12 will be described in detail with reference to FIG. 3. The digital line memory 11 includes memories MEM0, MEM1, MEM2, and MEM3 and switches SWT0, SWT1, SWT2, and SWT3. The horizontal scanning circuit 12 includes a shift register 21 for controlling the switches SWT0, SWT1, SWT2, and SWT3 and a shift register 22 for controlling the shift register 21. The shift register 21 includes flip-flops FFT0, FFT1, FFT2, and FFT3 and switches SWU0, SWU1, SWU2, SWU3, SWR0, SWR1, SWR2, SWR3, SWS0, SWS1, SWS2, and SWS3. The shift register 22 includes flip-flops FFR0, FFR1, FFR2, and FFR3. Each switch is in an on state when the control signal input to the control terminal is at the high level, and in an off state when the control signal input to the control terminal is at the low level.

Memories MEM0, MEM1, MEM2, and MEM3 are arranged corresponding to comparators Comp0, Comp1, Comp2, and Comp3, respectively. A count signal φCOUNTER_IN is input to the memories MEM0, MEM1, MEM2, and MEM3 from the control circuit 4 or a counter (not illustrated). The memories MEM0, MEM1, MEM2, and MEM3 store count values at the time when the potentials of the output signals from the corresponding comparators are inverted. The values stored in the memories MEM0, MEM1, MEM2, and MEM3 are digital signals corresponding to the potentials of the peripheral circuit column signal lines RVL0, RVL1, RVL2, and RVL3, respectively. In this way, digital signals after AD conversion are stored in the memories MEM0, MEM1, MEM2, and MEM3. A first terminal of each of the switches SWT0, SWT1, SWT2, and SWT3 is connected to a corresponding memory, and a second terminal thereof is connected to the horizontal transfer line 13. When the switches SWT0, SWT1, SWT2, and SWT3 are turned on in response to the control of the shift register 21, the signals held in the memories MEM0, MEM1, MEM2, and MEM3 are output to the horizontal transfer line 13.

Each of the flip-flops FFR0, FFR1, FFR2, and FFR3 has an input terminal D, clock terminals CK and CKB, and output terminals Q and QB. The output terminals QB of the flip-flops FFR0, FFR1, FFR2, and FFR3 are terminals that output signals obtained by logically inverting the signals of the output terminals Q. A clock signal φCKR is input from the control circuit 4 to the clock terminals CK of the flip-flops FFR0, FFR1, FFR2, and FFR3. A clock signal φCKRB, which is a signal obtained by logically inverting the clock signal φCKR, is input to the clock terminals CKB from the control circuit 4.

A control signal φDataR_IN is input to the input terminal D of the flip-flop FFR0 from the control circuit 4. A signal output from the output terminal Q of the flip-flop FFR0 is input to the control terminal of the switch SWR0 and the input terminal D of the flip-flop FFR1. The signal output from the output terminal QB of the flip-flop FFR0 is input to the control terminal of the switch SWU0 and the control terminal of the switch SWS0. The flip-flops FFR1, FFR2, and FFR3 in the second and subsequent stages have the same connection relationship, and thus description thereof will be omitted.

Each of the flip-flops FFT0, FFT1, FFT2, and FFT3 has an input terminal D, clock terminals CK and CKB, and output terminals Q and QB. A clock signal φCKS is input from the control circuit 4 to the clock terminals CK of the flip-flops FFT0, FFT1, FFT2, and FFT3. A clock signal φCKSB, which is a signal obtained by logically inverting the clock signal φCKS, is input to the clock terminals CKB from the control circuit 4. The output terminals QB of the flip-flops FFT0, FFT1, FFT2, and FFT3 are terminals that output signals obtained by logically inverting the signals of the output terminals Q. A signal from the output terminal QB can also be used to control the switch, but is not illustrated in FIG. 3.

An input node to which the control signal φDataS_IN is input from the control circuit 4 is connected to a first terminal of the switch SWU0 and a first terminal of the switch SWR0. The second terminal of the switch SWU0 is connected to the input terminal D of the flip-flop FFT0. An output terminal Q of the flip-flop FFT0 is connected to a first terminal of the switch SWS0. The second terminal of the switch SWR0 and the second terminal of the switch SWS0 are connected to the first terminals of the switch SWU1 and the switch SWR1. Here, the potential of the node between the output terminal Q of the flip-flop FFT0 and the first terminal of the switch SWS0 is output to the switch SWT0 as the control signal of the switch SWT0.

When the output terminal Q of the flip-flop FFR0 is at the low level and the output terminal QB is at the high level, the switch SWR0 is turned off, and the switches SWU0 and SWS0 are turned on. At this time, the flip-flop FFT0 is incorporated in the circuit of the shift register. When the output terminal Q of the flip-flop FFR0 is at the high level and the output terminal QB is at the low level, the switch SWR0 is on, and the switches SWU0 and SWS0 are off. At this time, the flip-flop FFT0 is in a non-connected state and is not incorporated in the shift register. Therefore, at this time, the switch SWT0 is not turned on, and the signal of the memory MEM0 is not read. The flip-flops FFR1, FFR2, and FFR3 in the second and subsequent stages have the same connection relationship, and thus description thereof will be omitted.

As described above, the shift register 21 includes a plurality of switches, and part of the flip-flops can be skipped to operate the shift register by the operation of the switches. Thus, it is possible to perform horizontal transfer in which a part of the memories MEM0, MEM1, MEM2, and MEM3 is not read.

Next, a more specific configuration of the switches in the switch group 5 and the flip-flops in the shift register 6 will be described. FIG. 4 illustrates a more specific circuit configuration of the selection unit 10 including the flip-flop FF1 and the switch SW1 in FIG. 1.

The flip-flop FF1 includes inverters IN1, IN2, IN3, and IN4 and switches SWF1, SWF2, SWF3, and SWF4. A clock signal φCK is input to control terminals of the switches SWF1 and SWF4. A clock signal φCKB is input to control terminals of the switches SWF2 and SWF3. Each switch is in an on state when the control signal input to the control terminal is at the high level, and in an off state when the control signal input to the control terminal is at the low level.

A first terminal of the switch SWF1 is an input terminal D of the flip-flop FF1. A second terminal of the switch SWF1 is connected to an input terminal of the inverter IN1 and a first terminal of the switch SWF2. An output terminal of the inverter IN1 is connected to an input terminal of the inverter IN2 and a first terminal of the switch SWF3. An output terminal of the inverter IN2 is connected to a second terminal of the switch SWF2. A second terminal of the switch SWF3 is connected to an input terminal of the inverter IN3 and a first terminal of the switch SWF4. An output terminal of the inverter IN3 is connected to an input terminal of the inverter IN4. An output terminal of the inverter IN4 is connected to a second terminal of the switch SWF4. The node of the input terminal of the inverter IN4 is the output terminal Q of the flip-flop FF1, and the node of the output terminal of the inverter IN4 is the output terminal QB of the flip-flop FF1. When the high-level pulse is input to the clock signal φCK, the level of the signal input to the input terminal D at that timing is taken into the flip-flop FF1, and the signal of that level is output from the output terminal Q.

The switch SW1 includes NMOS transistors NM1 and NM2 and PMOS transistors PM1 and PM2. The output signal of the output terminal Q of the flip-flop FF1 is input to the gate of the PMOS transistor PM1 and the gate of the NMOS transistor NM2. The output signal of the output terminal QB of the flip-flop FF1 is input to the gate of the NMOS transistor NM1 and the gate of the PMOS transistor PM2. The pixel column signal line PVL1 is connected to the drains of the NMOS transistors NM1 and NM2 and the sources of the PMOS transistors PM1 and PM2. The peripheral circuit column signal line RVL1 is connected to the source of NMOS transistor NM1 and the drain of PMOS transistor PM1. The peripheral circuit column signal line RVL2 is connected to the source of NMOS transistor NM2 and the drain of PMOS transistor PM2.

When the control signal output from the output terminal Q is at the low level and the control signal output from the output terminal QB is at the high level, the NMOS transistor NM1 and the PMOS transistor PM1 are in an on state. At this time, the NMOS transistor NM2 and the PMOS transistor PM2 are in an off state. Accordingly, the pixel column signal line PVL1 and the peripheral circuit column signal line RVL1 are electrically connected to each other.

When the control signal output from the output terminal Q is at the high level and the control signal output from the output terminal QB is at the low level, the NMOS transistor NM1 and the PMOS transistor PM1 are in an off state. At this time, the NMOS transistor NM2 and the PMOS transistor PM2 are in an on state. Accordingly, the pixel column signal line PVL1 and the peripheral circuit column signal line RVL2 are electrically connected to each other.

Next, a more specific layout of the switches in the switch group 5 and the flip-flops in the shift register 6 will be described with reference to FIG. 5. FIG. 5 schematically illustrates a layout of an arrangement of MOS transistors constituting the flip-flop FF1 and the switch SW1 and a wiring for transmitting a signal. "ACTIVE REGION" in FIG. 5 indicates an arrangement of active regions in a semiconductor substrate in which MOS transistors are formed. "POLYSILICON" in FIG. 5 indicates an arrangement of polysilicon forming the gate electrodes of the MOS transistors. "METAL 1" and "METAL 2" in FIG. 5 indicate arrangements of two wiring layers formed above the semiconductor substrate with an interlayer insulating film interposed therebetween. It is assumed that "METAL 2" is a layer farther from the semiconductor substrate than "METAL 1". "CONTACT" and "VIA" in FIG. 5 indicate arrangements of contacts connecting the wiring layer and the active regions or polysilicon and vias connecting the wiring layers.

"D", "CK", "CKB", "Q", "QB", "PVL1", "RVL1", and "RVL2" illustrated in FIG. 5 indicate wirings corresponding to these terminals illustrated in FIG. 1 or FIG. 4. "VDD" and "VSS" illustrated in FIG. 5 indicate wirings corresponding to power supply terminals of inverters constituting flip-flops.

As illustrated in FIG. 5, since the switch group 5 and the shift register 6 are arranged between the pixel array 2 and the analog peripheral circuit 7, the transistors constituting the flip-flop FF1 and the transistors constituting the switch SW1 are arranged in the vicinity thereof. A direction in which a signal from a pixel flows (a direction in which the pixel column signal line PVL1 extends) is defined as a vertical direction, and a direction perpendicular to the vertical direction is defined as a horizontal direction. At this time, as illustrated in FIG. 5, the flip-flop FF1 and the switch SW1 are arranged side by side in the horizontal direction. By adopting such a layout, the input terminal of the switch SW1 can be arranged in the vicinity of the output terminals Q and QB of the flip-flop FF1. This reduces an area required for wiring between the output of the flip-flop FF1 and the input of the switch SW1.

On the other hand, in a circuit configuration in which a shift register that controls a switch for switching comparators is disposed subsequent to the comparator as illustrated in FIGS. 3 and 5 of Japanese Patent Application Laid-Open No. 2009-213012, the wiring extending from the output of the shift register toward the input of the switch is long. In such a circuit configuration, a large area is required for this wiring. In contrast, in the present embodiment, since the shift register 6 for controlling the switches of the switch group 5 is arranged between the pixel array 2 and the analog peripheral circuit 7, the wiring between the shift register 6 and the switch group 5 is short, and the area required for the wiring can be reduced. Therefore, according to the present embodiment, the photoelectric conversion device 1 capable of reducing an occupied area of the circuit is provided.

Figure 6A:
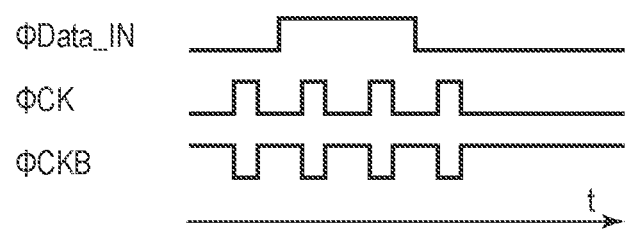
FIGS. 6A and 6B are timing charts illustrating settings of a shift register according to the first embodiment.
Figure 6B:
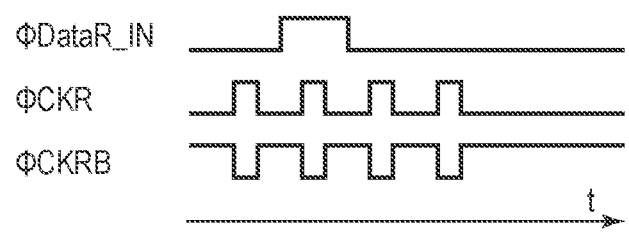
Figure 8:
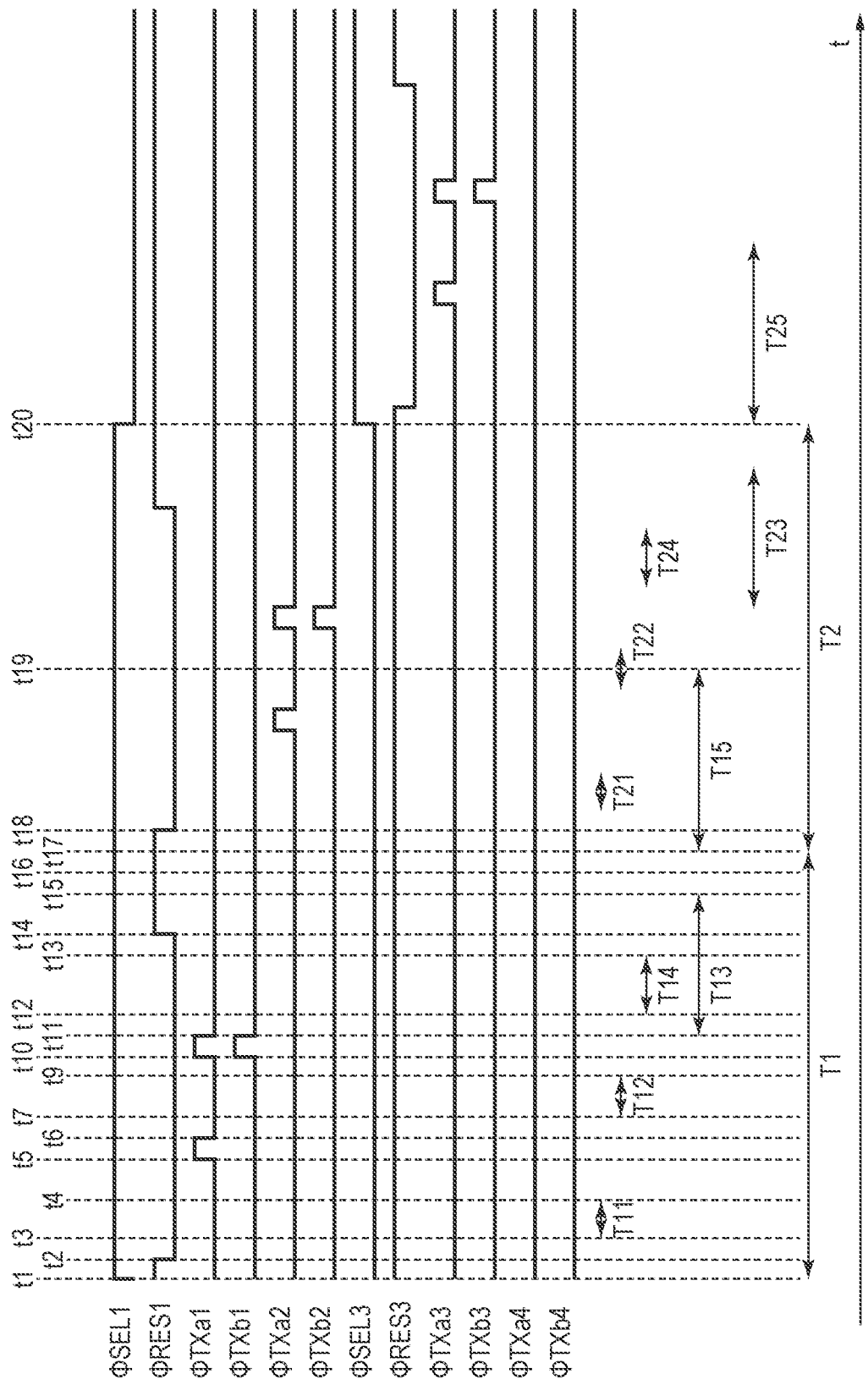
FIG. 8 is a timing chart illustrating the operation of the pixel array according to the first embodiment.

FIGS. 6A and 6B are timing charts illustrating settings of the shift register according to the present embodiment. FIGS. 7A and 7B are tables illustrating connections between pixel column signal lines and peripheral circuit column signal lines according to the embodiment. FIG. 8 is a timing chart illustrating the operation of the pixel array 2 according to the present embodiment. A driving method of the photoelectric conversion device 1 according to the present embodiment will be described with reference to FIGS. 6A to 8.

Prior to the description of the setting of the shift register, the setting of the unused column will be described. In the present embodiment, as described above, the number of columns of the pixel array 2 and the number of pixel column signal lines are three, whereas the number of peripheral circuit column signal lines, the number of columns of analog circuits in the analog peripheral circuit 7, and the number of columns of memories of the digital line memory 11 are four. That is, the number of columns of analog circuits and memories corresponding to one peripheral circuit column signal line (hereinafter, they may be collectively referred to as column circuits) is greater than the number of columns of the pixel array 2, and thus the circuit has a redundant configuration.

Thus, in the configuration of the present embodiment, one column circuit may be selected and the selected column circuit is not used for reading (unused). The unused column circuit may be, for example, a column circuit which is known to be defective due to a problem in a manufacturing process or the like. The position information (column number or the like) indicating the defective column circuit has already been acquired in advance in an inspection process at the time of manufacturing, an inspection function of the system in which the photoelectric conversion device 1 is mounted, or the like, and is stored in a storage device or the like in the control circuit 4. In the following description of the present embodiment, it is assumed that the column circuit corresponding to the peripheral circuit column signal line RVL1 at the second column from the left is defective, unless otherwise specified.

First, a method of setting a shift register will be described with reference to FIGS. 6A, 6B, 7A, and 7B. FIG. 6A illustrates temporal changes of the control signal φData_IN and the clock signals φCK and φCKB input to the shift register 6. FIG. 6B illustrates temporal changes of the control signal φDataR_IN and the clock signals φCKR and φCKRB input to the shift register 22. Note that the processes of FIGS. 6A and 6B are performed at a time before the readout of signals from the pixel array 2, for example, when the photoelectric conversion device 1 is powered on.

As illustrated in FIG. 6A, four pulses are input to the shift register 6 as clock signals φCK and φCKB. The control signal φData_IN is at the low level when the first and fourth pulses are input, and φData_IN is at the high level when the second and third pulses are input. After the input of the signal in FIG. 6A, the levels of the output signals of the flip-flops FF0, FF1, and FF2 coincide with the levels of the control signals φData_IN when the first, second, and third pulses are input, respectively. That is, the levels of the output signals of the flip-flops FF0, FF1, and FF2 are the low level, high level, and high level, respectively. These signals are input to the control terminals of the switches SW0, SW1, and SW2, and the connection between the pixel column signal lines and the peripheral circuit column signal lines is controlled. Here, the high-level potential is, for example, 3.3 V, and the low-level potential is, for example, 0 V.

FIG. 7B is a table illustrating connections between pixel column signal lines and peripheral circuit column signal lines when the signal of FIG. 6A is input to the shift register 6. FIG. 7B illustrates that a pixel column signal line and a peripheral circuit column signal line that are denoted by two reference numerals arranged vertically are connected to each other. For example, since the low-level signal is input to the switch SW0, the switch SW0 connects the pixel column signal line PVL0 and the peripheral circuit column signal line RVL0. FIG. 7B illustrates such a connection relationship in a table form. As can be understood from FIG. 7B, the peripheral circuit column signal line RVL1 is not connected to any pixel column signal line. Therefore, the control is performed so that the defective column circuit corresponding to the peripheral circuit column signal line RVL1 is unused.

As described above, in the present embodiment, when some of the column circuits are defective, the column circuits are unused, and the influence thereof can be eliminated. In addition, by performing defect detection in the inspection process at the time of manufacturing and making the defective column circuit unused, it is possible to set unused columns so that the influence of the defect does not appear even if there is a defective column circuit and ship them. Therefore, the yield in the manufacturing process is improved, and the manufacturing cost can be reduced.

Note that the connection relationship illustrated in FIG. 7A, for example, can be applied at the normal case (in the case where there is no defective column circuit). In this case, a column circuit corresponding to the peripheral circuit column signal line RVL3 is unused. This connection relationship can be realized, for example, by setting the control signal φData_IN in FIG. 6A to the low level over the entire period.

As illustrated in FIG. 6B, four pulses are input to the shift register 22 as the clock signals φCKR and φCKRB. When the first, third, and fourth pulses are input, the control signal φDataR_IN is at the low level, and when the second pulse is input, the control signal φDataR_IN is at the high level. After the input of the signal in FIG. 6B, the levels of the output signals from the output terminals Q of the flip-flops FFR0, FFR1, FFR2, and FFR3 coincide with the levels of the control signals φData_IN when the first, second, third, and fourth pulses are input, respectively. That is, the levels of the output signals from the output terminals Q of the flip-flops FFR0, FFR1, FFR2, and FFR3 are the low level, high level, low level, and low level, respectively. The levels of the output signals from the output terminals QB of the flip-flops FFR0, FFR1, FFR2, and FFR3 are the high level, low level, high level, and high level, respectively. These signals are input to the control terminals of the switches in the shift register 21. Here, the high-level potential is, for example, 1.2 V, and the low-level potential is, for example, 0 V. Since the shift registers 21 and 22 are formed by a process for digital circuits, the high-level potential of the shift registers 21 and 22 may be lower than the high-level potential of the shift register 6.

At this time, the switches SWR0, SWR1, SWR2, and SWR3 are turned off, turned on, turned off, and turned off, respectively. The switches SWU0, SWU1, SWU2, and SWU3 are turned on, turned off, turned on, and turned on, respectively. The switches SWS0, SWS1, SWS2, and SWS3 are turned on, turned off, turned on, and turned on, respectively. Accordingly, the shift register 21 operates by skipping the flip-flop FFT1, the potential of the output terminal Q of the flip-flop FFT1 is maintained at the low level, and the switch SWT1 is not turned on. Therefore, when signals are sequentially output from the memories in the digital line memory 11, the memory MEM1 is skipped and is not read. When the column circuit corresponding to the peripheral circuit column signal line RVL1 is defective, the digital signal held in the memory MEM1 is not necessary. Therefore, as described above, the memory MEM1 in the unused column is skipped and an external signal is output, whereby the processing efficiency can be improved.

Next, a method of reading signals from the pixel array 2 according to the present embodiment will be described with reference to FIG. 8. FIG. 8 illustrates changes in the control signals φSEL1, φRES1, φTXa1, φTXb1, φTXa2, φTXb2, φSEL3, φRES3, φTXa3, φTXb3, φTXa4, and φTXb4 illustrated in FIG. 2 with respect to time.

At time t1, control signal φSEL1 becomes the high level. Thereby, the selection transistor M4 in the first row is turned on, and the pixels in the first row and the second row are selected. At this time, since the control signals φRES1 and φRES3 are at the high level and the reset transistor M2 is in the on state, the potential of the floating diffusion NF is reset.

At time t2, the control signal φRES1 becomes the low level and the reset transistor M2 in the first row is turned off, whereby the reset of the potential of the floating diffusion NF in the first row is released.

In a period T11 between time t3 and time t4, a signal N is read based on the potential of the floating diffusion NF. During the period T11, AD conversion of the signals N from the pixel array 2 is performed, and the digital signals N after AD conversion are stored in the memories of columns other than the unused columns in the digital line memory 11.

At time t5, the control signal φTXa1 becomes the high level, and the transfer transistor Ma1 is turned on. Thus, the charges accumulated in the photoelectric conversion unit Da1 are transferred to the floating diffusion NF. At time t6, the control signal φTXa1 becomes the low level, and the transfer transistor Ma1 is turned off. This completes the charge transfer.

In a period T12 between time t7 and time t9, the signal A is read based on the potential of the floating diffusion NF after the charges from the photoelectric conversion unit Da1 is transferred. During this period T12, AD conversion of the signal A from the pixel array 2 is performed, and the digital signal A after AD conversion is stored in the memories of columns other than the unused columns in the digital line memory 11.

At time t10, the control signals φTXa1 and φTXb1 become the high level, and the transfer transistors Ma1 and Mb1 are turned on. Thus, the charges accumulated in the photoelectric conversion unit Db1 are transferred to the floating diffusion NF. At this time, the charges of the floating diffusion NF are the sum of the charges accumulated in the photoelectric conversion unit Da1 and the charges accumulated in the photoelectric conversion unit Db1. At time t11, the control signals φTXa1 and φTXb1 become the low level, and the transfer transistors Ma1 and Mb1 are turned off. This completes the charge transfer.

In a period T13 between the time t11 and time t15, horizontal transfer of the digital signal N and the digital signal A is performed. Memories in columns other than the unused columns of the digital line memory 11 sequentially output the digital signals N and the digital signals A to the output processing circuit 14 via the horizontal transfer line 13 under the control of the horizontal scanning circuit 12. The output processing circuit 14 performs correlated double sampling to remove noise by subtracting the digital signal N from the digital signal A. Then, the output processing circuit 14 converts the signal after the correlated double sampling into a serial format, and outputs the signal from the output terminals 17 and 18 to the outside by the LVDS method.

In a period T14 between time t12 and time t13, the signal A+B is read based on the potential of the floating diffusion NF after the charges from the photoelectric conversion units Da1 and Db1 have been transferred. During this period T14, AD conversion of the signal A+B from the pixel array 2 is performed, and the digital signal A+B after AD conversion is stored in the memories of columns other than the unused columns in the digital line memory 11.

In a period T15 between time t17 and time t19, horizontal transfer of the digital signal N and the digital signal A+B is performed. The memories in the columns other than the unused columns of the digital line memory 11 sequentially output the digital signal N and the digital signal A+B to the output processing circuit 14 via the horizontal transfer line 13 under the control of the horizontal scanning circuit 12. The output processing circuit 14 performs correlated double sampling to remove noise by subtracting the digital signal N from the digital signal A+B. Then, the output processing circuit 14 converts the signal after the correlated double sampling into a serial format, and outputs the signal from the output terminals 17 and 18 to the outside by the LVDS method.

At time t14, the control signal φRES1 becomes the high level and the reset transistor M2 in the first row is turned on, thereby resetting the potential of the floating diffusion NF in the first row. Thereafter, at time t18, the control signal φRES1 becomes the low level and the reset transistor M2 in the first row is turned off, whereby the reset of the potential of the floating diffusion NF in the first row is released. Thereafter, reading is performed on the photoelectric conversion units Da2 and Db2 in the second row by the same operation. Periods T21 to T25 related to reading in the second row illustrated in FIG. 8 correspond to periods T11 to T15 related to reading in the first row, respectively.

At time t20, the control signal φSEL1 becomes the low level. Thereby, the selection transistor M4 in the first row is turned off, and the selection of the pixels in the first row and the second row is released. At time t20, the control signal φSEL3 becomes the high level. Thereby, the selection transistor M4 in the third row is turned on, and the pixels in the third row and the fourth row are selected. The subsequent operations are the same as those in the first row and the second row, and thus description thereof will be omitted. Each of a period T1 from the time t1 to the time t17 and a period T2 from the time t17 to the time t20 represents one horizontal scanning period.

As described above, in the photoelectric conversion device 1 of the present embodiment, the shift register 6 for controlling the switches of the switch group 5 is arranged between the pixel array 2 and the analog peripheral circuit 7. Thus, the photoelectric conversion device 1 capable of reducing the occupied area of the circuit is provided. In the photoelectric conversion device 1 of the present embodiment, the number of analog circuits and peripheral circuit column signal lines in the analog peripheral circuit 7 is greater than the number of pixel column signal lines, and the analog peripheral circuit 7 has a redundant configuration. Thus, even when a part of the column circuit or the like is defective, the influence of the defect can be prevented from appearing by making the defective portion unused. By detecting the defective portion at the time of manufacturing, the yield in the manufacturing process is improved, and the manufacturing cost can be reduced.

The shift register 6 and the analog peripheral circuit 7 are preferably manufactured by a semiconductor process in which transistors with the same withstand voltage are formed. In other words, the shift register 6 and the analog peripheral circuit 7 preferably include semiconductor elements having the same withstand voltage. In this case, since it is not necessary to arrange a level shift circuit between the shift register 6 and the analog peripheral circuit 7 including the analog circuit, the occupied area can be reduced. In addition, the influence of the occupied area of an isolation region between the shift register 6 and the analog peripheral circuit 7 can be reduced.

In FIG. 1, a configuration in which a current source is included in the analog peripheral circuit 7 is illustrated, but the position of the current source is not limited to this, and the current source may be arranged at any position between the pixel array 2 and the comparator. For example, the current source may be arranged between the shift register 6 and the pixel array 2.

In the present embodiment, as illustrated in FIG. 3, a configuration in which horizontal scanning is performed by skipping some memories by the shift registers 21 and 22 is illustrated, but the method of removing signals output from the column circuits of unused columns is not limited to this. For example, the signal output from the column circuit of the unused column may be removed by calculation processing using a digital signal processor provided in the photoelectric conversion device 1 or a processor outside the photoelectric conversion device 1.

In the present embodiment, an example of a configuration in which signals from pixels in the pixel array 2 are read out one row at a time is illustrated, but a configuration in which a plurality of rows are read out simultaneously may be applied to speed up reading. In the structure in which a plurality of rows are read simultaneously, the number of column circuits and the like is large in order to simultaneously output signals from pixels of a plurality of rows in the same column, so that the occupied area tends to be large. Therefore, it is more effective to employ the configuration of the present embodiment having an effect of reducing the occupied area.

Although the clock signal φCK and the clock signal φCKB which is an inverted signal thereof are input to the flip-flops included in the shift registers 6, 21, and 22, only the clock signal φCK may be input. In this case, an inverted signal of the clock signal φCK may be generated inside the flip-flops or the like by arranging an inverter or the like.

Second Embodiment

In the photoelectric conversion device 1 according to the first embodiment, when there is only one defective column circuit, the switch group 5 is switched so that the one column is unused. In contrast, the photoelectric conversion device 1 of the present embodiment switches the switch groups 5 in units of a plurality of columns. In the description of the present embodiment, the description of elements common to those of the first embodiment may be omitted.

Figure 9:
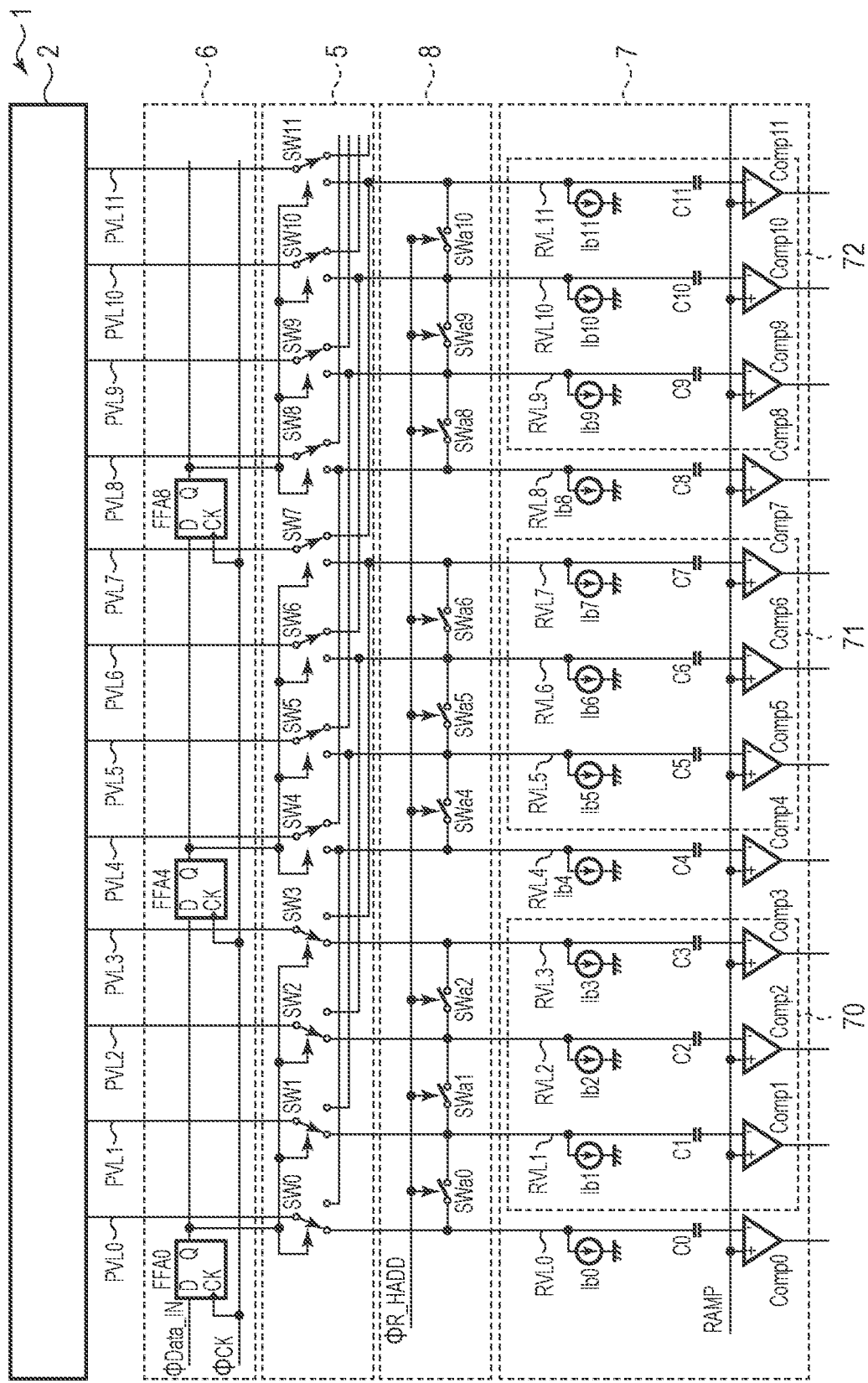
FIG. 9 is a block diagram of a photoelectric conversion device according to a second embodiment.

FIG. 9 is a block diagram of the photoelectric conversion device 1 according to the present embodiment. FIG. 9 differs from FIG. 1 in that an averaging unit 8 is added, and in that the circuit configurations of the switch group 5, the shift register 6, and the analog peripheral circuit 7 are changed. In FIG. 9, the number of columns illustrated in the figure is increased as compared with FIG. 1. Thus, twelve pixel column signal lines PVL0 to PVL11, twelve peripheral circuit column signal lines RVL0 to RVL11, twelve switches SW0 to SW11, twelve current sources Ib0 to Ib11, twelve clamp capacitors C0 to C11, and twelve comparators Comp0 to Comp11 are illustrated. In FIG. 9, the vertical scanning circuit 3, the control circuit 4, the digital line memory 11, the horizontal scanning circuit 12, the output processing circuit 14, and the output terminals 17 and 18 are not illustrated. Although only twelve columns are illustrated in FIG. 9, circuits having the same configuration are provided in the 13th column and the subsequent columns.

The shift register 6 includes flip-flops FFA0, FFA4, and FFA8. Each flip-flop controls four switches in the switch group 5. For example, a signal output from the output terminal Q of the flip-flop FFA0 is commonly input to the control terminals of the switches SW0, SW1, SW2, and SW3. An output terminal Q of the flip-flop FFA0 is connected to an input terminal of the flip-flop FFA4. The flip-flops FFA4 and FFA8 have the same connection relationship.

Input terminals of the switches SW0 to SW11 are connected to pixel column signal lines PVL0 to PVL11, respectively. First output terminals of the switches SW0 to SW11 are connected to peripheral circuit column signal lines RVL0 to RVL11, respectively. Second output terminals of the switches SW0 to SW11 are connected to peripheral circuit column signal lines separated by four columns. For example, the second output terminal of the switch SW0 is connected to the peripheral circuit column signal line RVL4.

The averaging unit 8 includes switches SWa0 to SWa2, SWa4 to SWa6, and SWa8 to SWa10. A control signal φR_HADD is input from the control circuit 4 to the control terminals of the switches SWa0 to SWa2, SWa4 to SWa6, and SWa8 to SWa10. These switches have a function of averaging signals of four peripheral circuit column signal lines. Each switch is in an on state when the control signal φR_HADD input to the control terminal is at the high level, and is in an off state when the control signal φR_HADD is at the low level.

A first terminal of the switch SWa0 is connected to the peripheral circuit column signal line RVL0, and a second terminal of the switch SWa0 is connected to the peripheral circuit column signal line RVL1. A first terminal of the switch SWa1 is connected to the peripheral circuit column signal line RVL1, and a second terminal of the switch SWa1 is connected to the peripheral circuit column signal line RVL2. A first terminal of the switch SWa2 is connected to the peripheral circuit column signal line RVL2, and a second terminal of the switch SWa2 is connected to the peripheral circuit column signal line RVL3. These switches are turned on when the control signal φR_HADD becomes the high level, and have a function of making it possible to average the potentials of four columns of peripheral circuit column signal lines RVL0, RVL1, RVL2, and RVL3. Since the other switches have the same connection relationship except that the arranged columns are different, the description thereof will be omitted. This averaging function can be applied when the number of pixels to be read out is reduced as compared with a case of still image shooting, such as when shooting a moving image. Further, averaging can be omitted by setting the control signal φR_HADD to the low level.

When the control signal φR_HADD is at the high level, a signal obtained by averaging four columns of the peripheral circuit column signal lines RVL0, RVL1, RVL2, and RVL3 is AD-converted in the analog peripheral circuit 7 and output from the comparator Comp0. Similarly, AD conversion results of signals obtained by averaging four columns are output from comparators Comp4 and Comp8.

Here, the analog circuit groups 70, 71, and 72 are unused when the control signal φR_HADD is at the high level. Therefore, when the control signal φR_HADD is at the high level, the power supply in the analog circuit groups 70, 71, and 72 may be controlled to be off in conjunction therewith. Thus, power consumption during averaging can be reduced.

Figure 10:
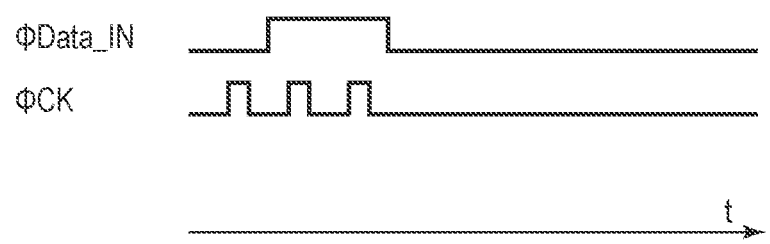
FIG. 10 is a timing chart illustrating a setting of the shift register according to the second embodiment.

FIG. 10 is a timing chart illustrating the setting of the shift register according to the present embodiment. FIGS. 11A, 11B, 11C, and 11D are tables illustrating connections between pixel column signal lines and peripheral circuit column signal lines according to the present embodiment. A driving method of the photoelectric conversion device 1 according to the present embodiment will be described with further reference to these drawings.

FIG. 11A is a table illustrating connections between the pixel column signal lines and the peripheral circuit column signal lines when averaging is not performed (all-pixel readout) and when the column circuits are not defective (normal). This connection relationship is realized by setting the control signal φR_HADD to the low level. As described above, all-pixel readout can be used, for example, for still image shooting.

FIG. 11C is a table illustrating the connections between the pixel column signal lines and the peripheral circuit column signal lines in when averaging of four peripheral circuit column signal lines in four columns is performed (four-column analog signal averaging) and when the column circuits are not defective (normal). This connection relationship is realized by setting the control signal φR_HADD to the high level. The readout in which averaging is performed as described above can be used, for example, in moving image shooting. Here, the power supply of unused column circuits corresponding to the peripheral circuit column signal lines RVL1 to RVL3, RVL5 to RVL7, RVL9 to RVL11, and the like may be controlled to be off. In the two cases of FIGS. 11A and 11C, the control signal φData_IN may be at the low level throughout the entire period.

FIG. 10 illustrates temporal changes of the control signal φData_IN and the clock signal φCK when the column circuit corresponding to the peripheral circuit column signal line RVL4 in the fifth column from the left is defective. As illustrated in FIG. 10, three pulses are input to the shift register 6 as the clock signal φCK. The control signal φData_IN is at the low level when the first pulse is input, and φData_IN is at the high level when the second and third pulses are input. After the input of the signals in FIG. 10, the levels of the output signals of the flip-flops FFA0, FFA4, and FFA8 coincide with the levels of the control signals φData_IN when the first, second, and third pulses are input, respectively. That is, the levels of the output signals of the flip-flops FFA0, FFA4, and FFA8 are the low level, high level, and high level, respectively. These signals are input to the control terminals of the switches SW0 to SW11, and the connection between the pixel column signal lines and the peripheral circuit column signal lines is controlled.

FIG. 11B is a table illustrating connections between the pixel column signal lines and the peripheral circuit column signal lines when averaging is not performed (all-pixel readout) and when the signals of FIG. 10 are input to the shift register 6. This connection relationship is realized by setting the control signal φR_HADD to the low level. For example, since the high-level signal is input to the switch SW4, the switch SW4 connects the pixel column signal line PVL4 and the peripheral circuit column signal line RVL8. As understood from FIG. 11B, the peripheral circuit column signal line RVL4 is not connected to any pixel column signal line. Therefore, the column circuit corresponding to the defective peripheral circuit column signal line RVL4 is controlled to be unused.

FIG. 11D is a table illustrating the connections between the pixel column signal lines and the peripheral circuit column signal lines when averaging of four peripheral circuit column signal lines is performed (four-column analog signal averaging) and when the signals of FIG. 10 are input to the shift register 6. This connection relationship is realized by setting the control signal φR_HADD to the high level. As understood from FIG. 11D, the peripheral circuit column signal lines RVL4, RVL5, RVL6, and RVL7 are not connected to any pixel column signal lines. Therefore, the control is performed so that the column circuits corresponding to the defective peripheral circuit column signal line RVL4 and the peripheral circuit column signal lines RVL5, RVL6, and RVL7 which can be averaged with the defective peripheral circuit column signal line RVL4 are unused. Here, the power supply of the unused column circuits corresponding to the peripheral circuit column signal lines RVL1 to RVL7, RVL5 to RVL11, and the like may be controlled to be off.

As described above, in the present embodiment, the switch group 5 can be switched in units of a plurality of columns. Thus, when the signals of the plurality of columns can be averaged, the column circuits corresponding to the columns to be averaged can be collectively unused. Thus, even in the circuit configuration having the function of averaging the signals of a plurality of columns, the same effect as in the first embodiment can be obtained.

Third Embodiment

In the photoelectric conversion device 1 of the present embodiment, a potential input/output function of the pixel column signal lines and the peripheral circuit column signal lines is added to the photoelectric conversion device 1 of the first embodiment. In the description of the present embodiment, the description of elements common to those of the first embodiment may be omitted.

Figure 12:
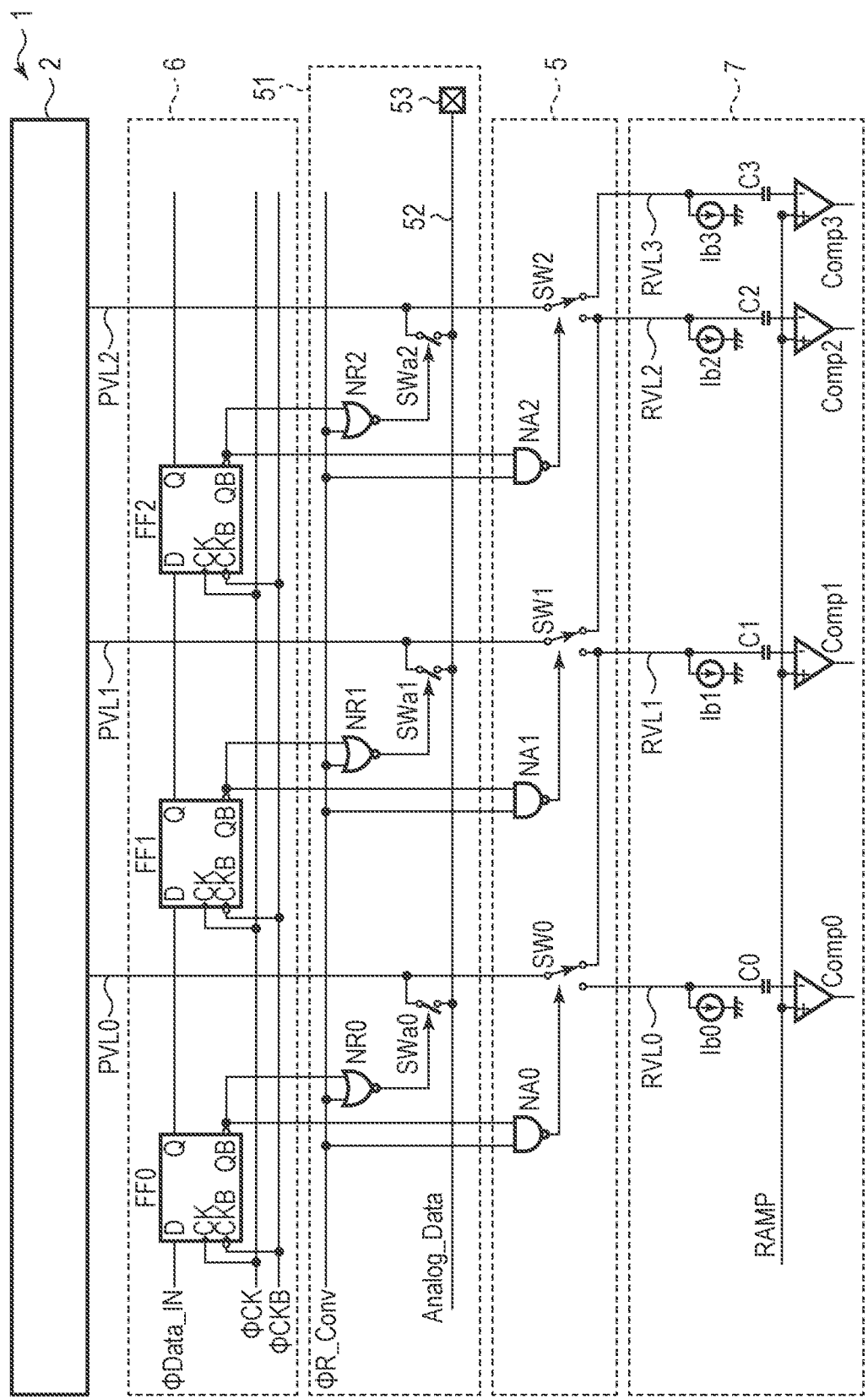
FIG. 12 is a block diagram of a photoelectric conversion device according to a third embodiment.

FIG. 12 is a block diagram of the photoelectric conversion device 1 according to the present embodiment. FIG. 12 differs from FIG. 1 in that a potential input/output unit 51 is added and a circuit configuration of the switch group 5 is changed. In FIG. 12, the vertical scanning circuit 3, the control circuit 4, the digital line memory 11, the horizontal scanning circuit 12, the output processing circuit 14, and the output terminals 17 and 18 are not illustrated.

The potential input/output unit 51 includes NOR circuits NR0, NR1, and NR2, switches SWa0, SWa1, and SWa2, an analog signal line 52, and an input/output terminal 53. The switch group 5 further includes NAND circuits NA0, NA1, and NA2 in addition to the switches SW0, SW1, and SW2. It is assumed that the switches SWa0, SWa1, and SWa2 are in an on state when a signal input to the control terminal is at the high level, and are in an off state when a signal input to the control terminal is at the low level.

A control signal φR_Conv is input from the control circuit 4 to first input terminals of the NOR circuits NR0, NR1, and NR2 and first input terminals of the NAND circuits NA0, NA1, and NA2. Signals from the output terminals QB of the flip-flops FF0, FF1, and FF2 are input to second input terminals of the NOR circuits NR0, NR1, and NR2, respectively. The signals from the output terminals QB of the flip-flops FF0, FF1, and FF2 are also input to second input terminals of the NAND circuits NA0, NA1, and NA2, respectively. Signals from output terminals of NOR circuits NR0, NR1, and NR2 are input to control terminals of switches SWa0, SWa1, and SWa2, respectively. Signals from output terminals of the NAND circuits NA0, NA1, and NA2 are input to control terminals of the switches SW0, SW1, and SW2, respectively.

First terminals of the switches SWa0, SWa1, and SWa2 are connected to the pixel column signal lines PVL0, PVL1, and PVL2, respectively. Second terminals of the switches SWa0, SWa1, and SWa2 are connected to the analog signal line 52. The analog signal line 52 is connected to the input/output terminal 53. The input/output terminal 53 is an external terminal such as an electrode pad. When the input/output terminal 53 is an electrode pad, the potential of the analog signal line 52 can be measured by bringing a probe of a measuring instrument such as an oscilloscope into contact with the electrode pad. Alternatively, a potential can be supplied to the analog signal line 52 by bringing a probe of a power supply device into contact with the electrode pad.

When the control signal φR_Conv is at the high level, the outputs of the NOR circuits NR0, NR1, and NR2 are at the low level, and the switches SWa0, SWa1, and SWa2 are off. At this time, since the outputs of the NAND circuits NA0, NA1, and NA2 coincide with an inverted signal of the output terminal QB, the inverted signal of the output terminal QB is input to the switches SW0, SW1, and SW2. Therefore, when the control signal φR_Conv is at the high level, the photoelectric conversion device 1 of the present embodiment performs the same operation as that of the first embodiment.

When the control signal φR_Conv is at the low level, the outputs of the NOR circuits NR0, NR1, and NR2 coincide with an inverted signal of the output terminal QB. Therefore, the switches SWa0, SWa1, and SWa2 are controlled to be on or off in accordance with the inverted signal of the output terminal QB. At this time, the outputs of the NAND circuits NA0, NA1, and NA2 are at the high level, and the second output terminals (the right terminals) of the switches SW0, SW1, and SW2 are selected.

Figure 13:
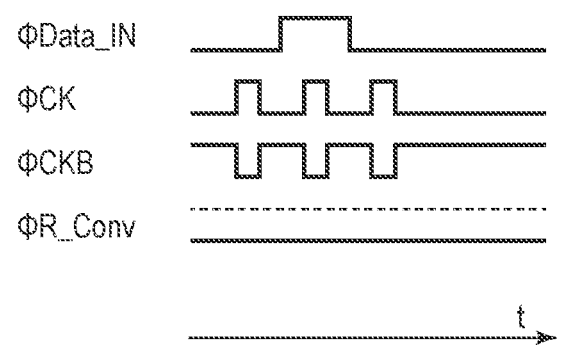
FIG. 13 is a timing chart illustrating a setting of the shift register according to the third embodiment.

FIG. 13 is a timing chart illustrating the setting of the shift register according to the present embodiment. FIG. 13 illustrates temporal changes of the control signal φData_IN and the clock signals φCK and φCKB input to the shift register 6 and the level of the control signal φR_Conv.

As illustrated in FIG. 13, the control signal φR_Conv is at the low level. As illustrated in FIG. 13, three pulses are input to the shift register 6 as the clock signals φCK and φCKB. The control signal φData_IN is at the low level when the first and third pulses are input, and φData_IN is at the high level when the second pulse is input. After the input of the signal in FIG. 13, the levels of the output terminals QB of the flip-flops FF0, FF1, and FF2 coincide with the levels of the inverted signals of the control signals φData_IN when the first, second, and third pulses are input, respectively. That is, the levels of the output signals of the output terminals QB of the flip-flops FF0, FF1, and FF2 are the high level, low level, and high level, respectively. Thus, of the switches SWa0, SWa1, and SWa2, only the switch SWa1 is turned on, and the pixel column signal line PVL1 and the analog signal line 52 are connected. The analog signal line 52 and the pixel column signal line of any column can be connected by changing the timing of the pulses of the control signal φData_IN.

As described above, in the present embodiment, the potential input/output unit 51 capable of connecting any pixel column signal line to the input/output terminal 53 is provided. Thus, it is possible to measure the temporal change of the potential of any pixel column signal line. For example, in the shipment inspection, by measuring the potential of the pixel column signal line, it is possible to detect an abnormality inside the device and improve the quality.

This measurement result can also be used for defect cause analysis. An abnormal portion in a pixel column signal line or transistors around the pixel column signal line can be estimated from a change in potential over time. By analyzing the cause of failure by such a method, root cause analysis of process failure can be performed, yield can be improved, and internal failure cost can be reduced. In addition, defects such as point flaws and line flaws may occur after shipment to the market. In the present embodiment, since the change over time of the potential of the defect occurrence portion can be measured, the root cause analysis of the defect occurred after shipment can be performed, and the external failure cost can be reduced.

Further, by applying a potential that changes with time to the input/output terminal 53 and measuring a normal output signal, it is possible to analyze the cause of a defect such as smear caused by the analog peripheral circuit 7. Further, the validity of the circuit simulation of the analog peripheral circuit 7 can be confirmed by this method.

Fourth Embodiment

The photoelectric conversion device 1 of the present embodiment can change a relationship between a color arrangement of the pixel array 2 and the column circuits. In the description of the present embodiment, the description of elements common to those of the first embodiment may be omitted.

Figure 14:
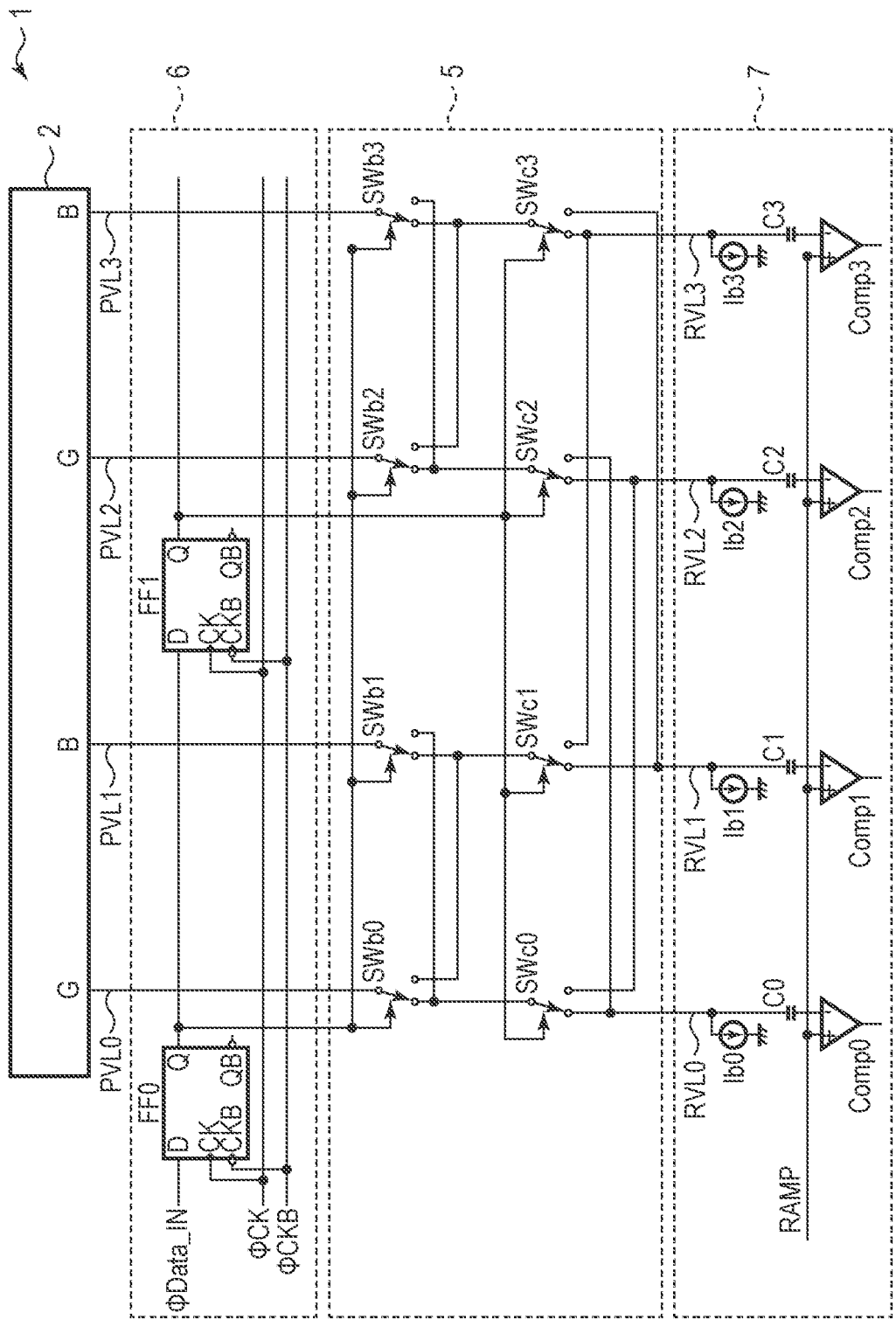
FIG. 14 is a block diagram of a photoelectric conversion device according to a fourth embodiment.

FIG. 14 is a block diagram of the photoelectric conversion device 1 according to the present embodiment. FIG. 14 differs from FIG. 1 in that the number of pixel column signal lines extending from the pixel array 2 is changed, and in that circuit configurations of the switch group 5 and the shift register 6 are changed. In FIG. 14, the vertical scanning circuit 3, the control circuit 4, the digital line memory 11, the horizontal scanning circuit 12, the output processing circuit 14, and the output terminals 17 and 18 are not illustrated.

In the present embodiment, four pixel column signal lines PVL0, PVL1, PVL2, and PVL3 extend from the pixel array 2 toward the switch group 5. Therefore, in the present embodiment, the number of analog circuits and peripheral circuit column signal lines is the same as the number of pixel column signal lines. In the pixel array 2 of the present embodiment, color filters are arranged such that red (R), green (G), and blue (B) pixels form a Bayer arrangement. The pixel column signal lines PVL0, PVL1, PVL2, and PVL3 illustrated in FIG. 14 transmit green (G), blue (B), green (G), and blue (B) signals, respectively.

The shift register 6 includes flip-flops FF0 and FF1. The switch group 5 includes switches SWb0, SWb1, SWb2, and SWb3 arranged in the first stage, and switches SWc0, SWc1, SWc2, and SWc3 arranged in the second stage. A signal output from the output terminal Q of the flip-flop FF0 is input to control terminals of the switches SWb0, SWb1, SWb2, and SWb3. A signal output from the output terminal Q of the flip-flop FF1 is input to control terminals of the switches SWc0, SWc1, SWc2, and SWc3.

Input terminals of the switches SWb0, SWb1, SWb2, and SWb3 are connected to pixel column signal lines PVL0, PVL1, PVL2, and PVL3, respectively. A first output terminal of the switch SWb0 and a second output terminal of the switch SWb1 are connected to an input terminal of the switch SWc0. A second output terminal of the switch SWb0 and a first output terminal of the switch SWb1 are connected to an input terminal of the switch SWc1. A first output terminal of the switch SWb2 and a second output terminal of the switch SWb3 are connected to an input terminal of the switch SWc2. A second output terminal of the switch SWb2 and a first output terminal of the switch SWb3 are connected to an input terminal of the switch SWc3.

A first output terminal of the switch SWc0 and a second output terminal of the switch SWc2 are connected to the peripheral circuit column signal line RVL0. A second output terminal of the switch SWc0 and a first output terminal of the switch SWc2 are connected to the peripheral circuit column signal line RVL2. A first output terminal of the switch SWc1 and a second output terminal of the switch SWc3 are connected to the peripheral circuit column signal line RVL1. A second output terminal of the switch SWc1 and a first output terminal of the switch SWc3 are connected to the peripheral circuit column signal line RVL3. Thus, the switch group 5 can change the connection relationship between the pixel column signal lines PVL0, PVL1, PVL2, and PVL3 and the peripheral circuit column signal lines RVL0, RVL1, RVL2, and RVL3 in accordance with the outputs of the flip-flops FF0 and FF1.

FIG. 15 is a table illustrating connections between the pixel column signal lines and the peripheral circuit column signal lines according to the present embodiment. FIG. 15 illustrates four combinations of connections corresponding to the levels of the output signals of the flip-flops FF0 and FF1 (FF0 output and FF1 output). In the table, "0" and "1" indicate the low level and the high level, respectively. When there is no defect in the column circuit (normal), both of the flip-flops FF0 and FF1 are controlled so that the output signals are at the low level.

On the other hand, when a column circuit corresponding to the peripheral circuit column signal line RVL1 in the second column from the left is defective, the output signal of the flip-flop FF0 is controlled to be at the high level. Here, the output signal of the flip-flop FF1 may be the low level ("RVL1 is defective (1)" in FIG. 15) or the high level ("RVL1 is defective (2)" in FIG. 15). In this case, the peripheral circuit column signal RLV1 is connected to the pixel column signal line PVL0 or the pixel column signal line PVL2, that is, the pixel column signal line transmitting the green (G) signal. Here, the defect means not a major defect in which a signal cannot be output, but a minor defect in which a faint vertical line flaw occurs, for example, the performance of the current source Ib1 is different from that of other current sources.

The effect of performing such a connection when the defect occurs will be described. Generally, a level of an output signal of blue (B) from the pixel array 2 is about half the level of an output signal of green (G). Therefore, in order to ensure white balance, a gain of about twice that of the green (G) signal may be applied to the blue (B) signal. At this time, when a blue (B) signal is output through a column circuit in which a defect such as a faint vertical line flaw occurs, the faint vertical line flaw is emphasized to about twice, and an image in which the vertical line flaw is easily visually recognized is obtained.

Therefore, in the present embodiment, a column circuit in which a defect such as a faint vertical line flaw occurs is connected to a pixel column signal line transmitting a green (G) signal. Thus, since the gain is smaller than that in the case of connecting to the pixel column signal line transmitting the blue (B) signal, an image in which the vertical line flaw is less likely to be visually recognized can be obtained.

Further, in the present embodiment, it is not necessary to make the analog peripheral circuit 7 redundant, so that an area of the analog peripheral circuit 7 is reduced. In addition, since a pitch of the pixel columns in the pixel array 2 and a pitch of the columns in the analog peripheral circuit 7 can be made the same, the efficiency of layout design is improved. For one or both of these reasons, the present embodiment provides the photoelectric conversion device 1 capable of reducing the occupied area of the circuit.

In the reading method of the present embodiment, since the order of the signals output from the analog peripheral circuit 7 is changed, it may be necessary to return the order to the original order in a subsequent circuit or the like. As a specific method, for example, a method may be employed in which a switch group similar to the switch group 5 is arranged in the subsequent stage of the analog peripheral circuit 7 and the signal order is restored. As another method, the control circuit 4 or the like may transmit information indicating the order of signals to a digital signal processor in the photoelectric conversion device 1 or a system outside the photoelectric conversion device 1, and the digital signal processor or the system may perform signal processing in which the order of signals is restored to the original order. As yet another method, the configuration of the horizontal scanning circuit 12 may include a decoder, and the decoder may control to transfer signals from the memory to the horizontal transfer line 13 in such an order as to return the order of signals.

In the present embodiment, the switches in the switch group 5 have a two-stage configuration, but the number of stages may be any number, and the number of stages may be one or three or more. That is, the number of switches and the number of stages in the switch group 5 are not particularly limited.

Fifth Embodiment

The photoelectric conversion device 1 according to the present embodiment is configured such that, when there is a defective column circuit, the influence of the defective column circuit is dispersed to make it difficult to visually recognize the influence. In the description of the present embodiment, the description of elements common to any of the first to fourth embodiments may be omitted.

Figure 16:
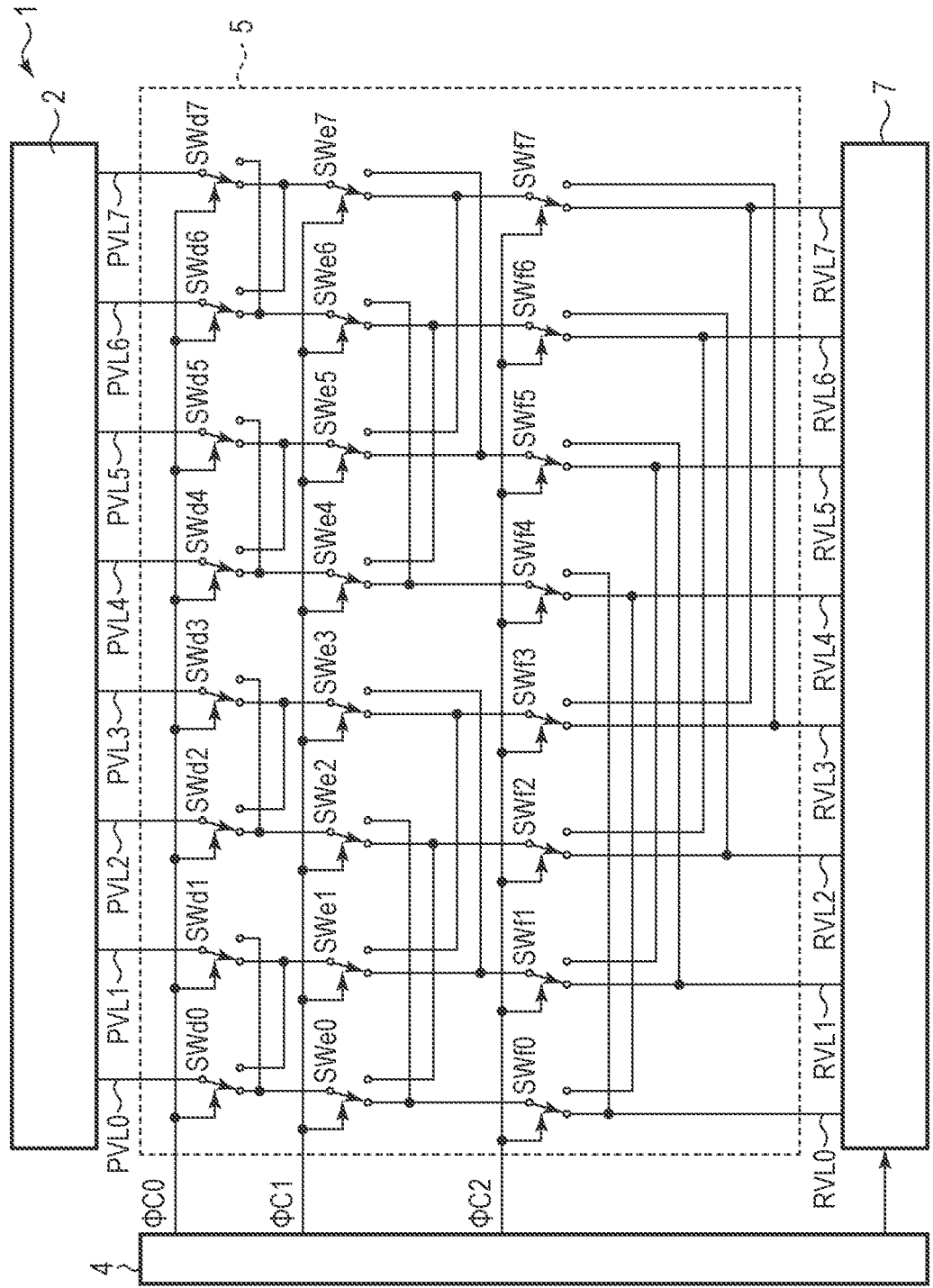
FIG. 16 is a block diagram of a photoelectric conversion device according to a fifth embodiment.

FIG. 16 is a block diagram of the photoelectric conversion device 1 according to the present embodiment. FIG. 16 differs from FIG. 1 in that the number of pixel column signal lines and peripheral circuit column signal lines is changed, a circuit configuration of the switch group 5 is changed, and the shift register 6 is not arranged. In FIG. 16, the vertical scanning circuit 3, the digital line memory 11, the horizontal scanning circuit 12, the output processing circuit 14, and the output terminals 17 and 18 are not illustrated.

In the present embodiment, eight pixel column signal lines PVL0 to PVL7 extend from the pixel array 2 toward the switch group 5. Eight peripheral circuit column signal lines RVL0 to RVL7 extend from the switch group 5 toward the analog peripheral circuit 7. Therefore, in the present embodiment, the number of analog circuits and peripheral circuit column signal lines is the same as the number of pixel column signal lines.

The switch group 5 includes switches SWd0 to SWd7 arranged in the first stage, switches SWe0 to SWe7 arranged in the second stage, and switches SWf0 to SWf7 arranged in the third stage. A control signal φC0 is input from the control circuit 4 to control terminals of the switches SWd0 to SWd7 arranged in the first stage. A control signal φC1 is input from the control circuit 4 to control terminals of the switches SWe0 to SWe7 arranged in the second stage. A control signal φC2 is input from the control circuit 4 to control terminals of the switches SWf0 to SWf7 arranged in the third stage. The switches in the switch group 5 change the connection relationship between the pixel column signal lines PVL0 to PVL7 and the peripheral circuit column signal lines RVL0 to RVL7 in accordance with the control signals φC0, φC1, and φC2. Since the purpose of the connection relation of the switches is the same as that in FIG. 14 except that the number of stages and the number of columns are increased, the description of the connection relation of the switches in the switch group 5 will be omitted.

FIG. 17 is a table illustrating connections between the pixel column signal lines and the peripheral circuit column signal lines according to the present embodiment. FIG. 17 illustrates combinations of eight connections corresponding to the levels of the control signals φC0, φC1, and φC2. In the table, "0" and "1" indicate the low level and the high level, respectively.

In the present embodiment, for example, by changing the combination of the levels of the control signals φC0, φC1, and φC2 for each horizontal scanning period, the combination of connections can be changed as illustrated in FIG. 17. Thus, when one column circuit corresponding to any one of the eight peripheral circuit column signal lines is defective, a flaw occurring in an output image is converted into a point flaw instead of a vertical line flaw. Since the point flaws are harder to visually recognize than the vertical line flaws, according to the present embodiment, an image in which the flaws are harder to visually recognize can be obtained. It is not essential to change the combination of the control signals φC0, φC1, and φC2 every horizontal scanning period. If the combination of the control signals φC0, φC1, and φC2 is changed one or more times within the reading period of one frame, the visibility of vertical line flaws is reduced.

The method of changing the combination of the levels of the control signals φC0, φC1, and φC2 for each horizontal scanning period may be, for example, a method of applying the combination of FIG. 17 in order from top, or a method of changing the combination in a predetermined order other than this. However, it is desirable that φC0, φC1, and φC2 be pseudo-random signals that change for each horizontal scanning period. In this case, since the positions where the flaws are generated are random, the visibility of the flaws is further reduced.

Further, in the present embodiment, it is not necessary to make the analog peripheral circuit 7 redundant, so that an area of the analog peripheral circuit 7 is reduced. In addition, since a pitch of the pixel columns in the pixel array 2 and a pitch of the columns in the analog peripheral circuit 7 can be made the same, the efficiency of layout design is improved. For one or both of these reasons, the present embodiment provides the photoelectric conversion device 1 capable of reducing the occupied area of the circuit.

Also in the reading method of the present embodiment, since the order of the signals output from the analog peripheral circuit 7 is changed, it may be necessary to return the order to the original order in a subsequent circuit or the like. As a specific method, several examples described in the fourth embodiment can be applied in the same manner.

In the present embodiment, the switches in the switch group 5 have a three-stage configuration, but the number of stages may be any number, and the number of stages may be one stage, two stages, or four or more. That is, the number of switches and the number of stages in the switch group 5 are not particularly limited.

Sixth Embodiment

The photoelectric conversion device 1 of the present embodiment is a modified example of the fifth embodiment, and reduces the influence of defective pixels that cause point flaws in the pixel array 2. In the description of the present embodiment, the description of elements common to any of the first to fifth embodiments may be omitted.

Figure 18:
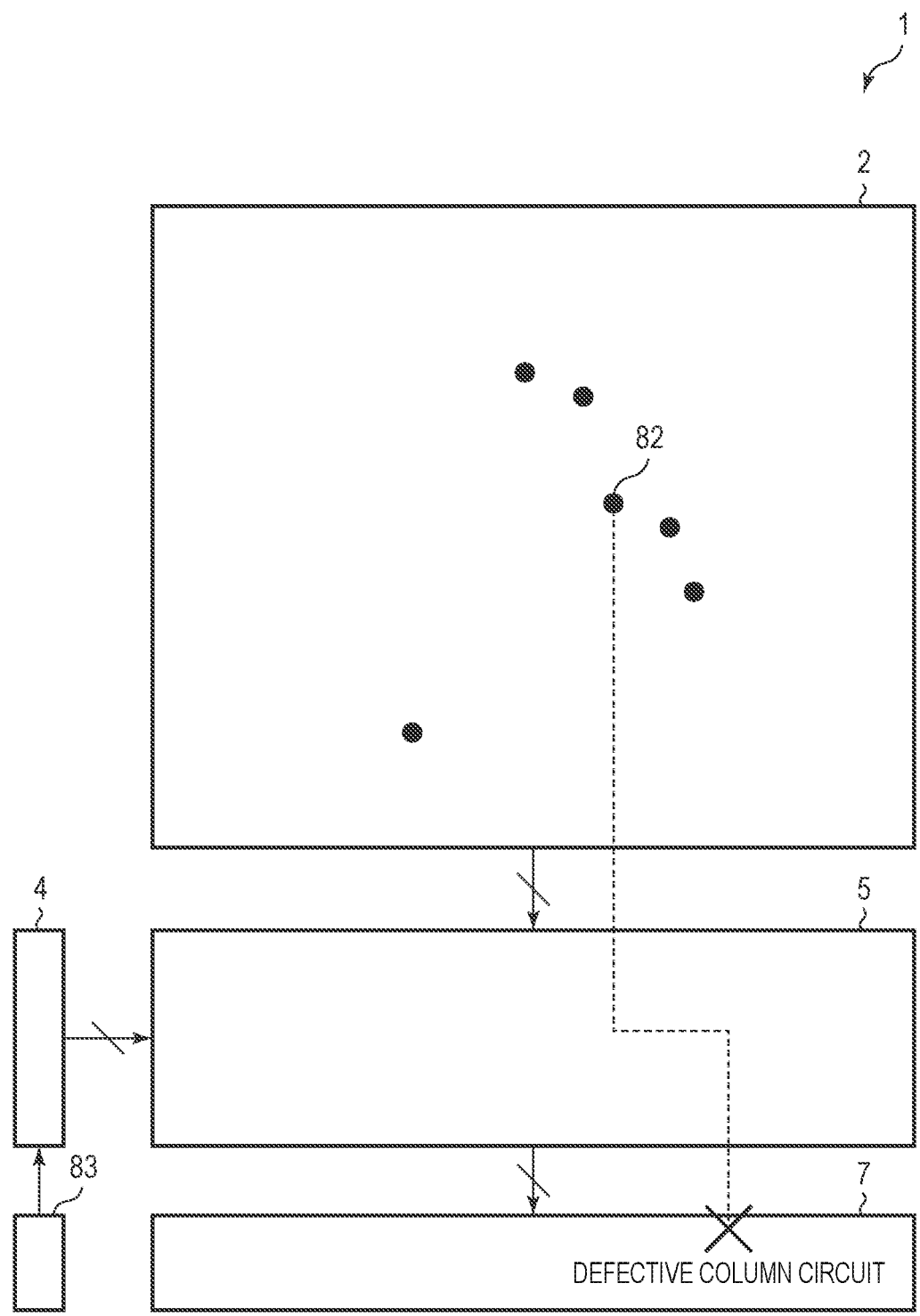
FIG. 18 is a block diagram schematically illustrating the operation of the photoelectric conversion device according to a sixth embodiment.

FIG. 18 is a block diagram schematically illustrating the operation of the photoelectric conversion device 1 according to the present embodiment. FIG. 18 schematically illustrates point flaws 82 in the pixel array 2, a defective column circuit in the analog peripheral circuit 7, and a point flaw memory 83 for supplying coordinate information of the point flaws 82 to the control circuit 4. In FIG. 18, the vertical scanning circuit 3, the digital line memory 11, the horizontal scanning circuit 12, the output processing circuit 14, and the output terminals 17 and 18 are not illustrated.

In the present embodiment, it is assumed that the pixel array 2 has point flaws 82 caused by defective pixels or the like. Further, it is assumed that a part of the column circuits in the analog peripheral circuit 7 is defective ("defective column circuit" in FIG. 18). Normally, a signal from the point flaw 82 of the pixel array 2 can be complemented by image processing using the signals from the surrounding pixel. Therefore, the pixel signal from the point flaw 82 does not contribute to image formation. According to the method of the fifth embodiment, by controlling the switch group 5 so that the reading of the position of the point flaw 82 is performed by the defective column circuit, the flaw caused by the point flaw 82 and the flaw caused by the defective column circuit can be overlapped. In this way, by controlling the switch group 5 such that the defective portion in the pixel array 2 and the defective portion in the analog peripheral circuit 7 are connected to each other, the number of flaws included in the entire image can be reduced.

In this example, the point flaw memory 83 stores coordinate information of the point flaws 82 obtained in shipment inspection or the like. The control circuit 4 controls the switch group 5 to overlap the flaw caused by the point flaw 82 and the flaw caused by the defective column circuit by referring to the coordinate information of the point flaw memory 83.

According to the present embodiment, the flaw caused by the point flaw 82 and the flaw caused by the defective column circuit are overlapped to provide the photoelectric conversion device 1 in which flaws can be reduced.

Seventh Embodiment

Figure 19:
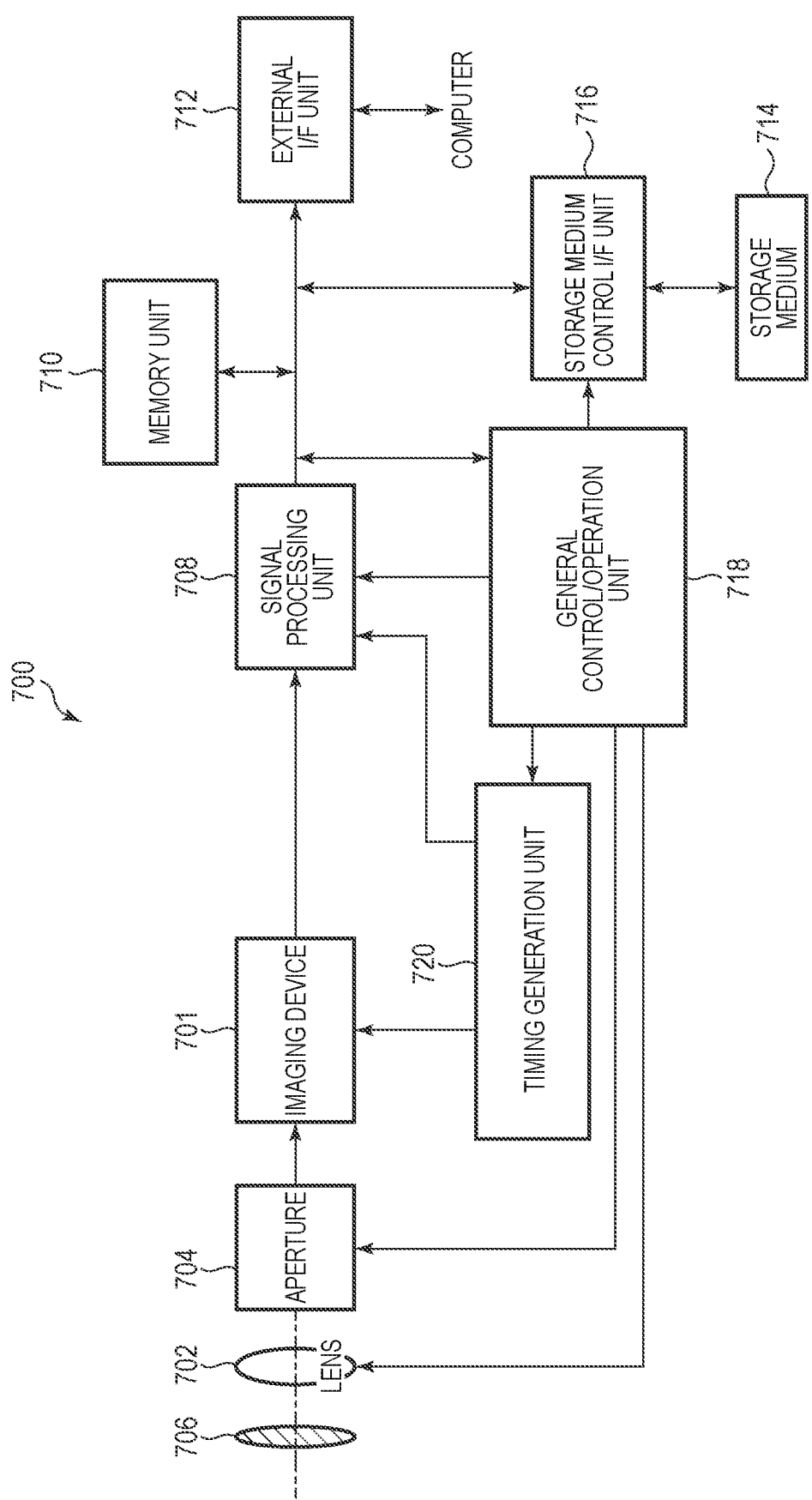
FIG. 19 is a block diagram of equipment according to a seventh embodiment.

The photoelectric conversion device in the above-described embodiments can be applied to various equipment. Examples of the equipment include a digital still camera, a digital camcorder, a camera head, a copier, a fax machine, a cellular phone, an in-vehicle camera, an observation satellite, and a surveillance camera. FIG. 19 is a block diagram of a digital still camera as an example of equipment.

Equipment 700 illustrated in FIG. 19 includes a barrier 706, a lens 702, an aperture 704, and an imaging device 701 (an example of the photoelectric conversion device). The equipment 700 further includes a signal processing unit (processing device) 708, a timing generation unit 720, a general control/operation unit 718 (control device), a memory unit 710 (storage device), a storage medium control I/F unit 716, a storage medium 714, and an external I/F unit 712. At least one of the barrier 706, the lens 702, and the aperture 704 is an optical device corresponding to the equipment. The barrier 706 protects the lens 702, and the lens 702 forms an optical image of an object on the imaging device 701. The aperture 704 varies the amount of light passing through the lens 702. The imaging device 701 is configured as in the above-described embodiment, and converts an optical image formed by the lens 702 into image data (image signal). The signal processing unit 708 performs various types of correction, data compression, and the like on the imaging data output from the imaging device 701. The timing generation unit 720 outputs various timing signals to the imaging device 701 and the signal processing unit 708. The general control/operation unit 718 controls the overall digital still camera, and the memory unit 710 temporarily stores image data. The storage medium control I/F unit 716 is an interface for storing or reading image data in or from the storage medium 714, and the storage medium 714 is a removable storage medium such as a semiconductor memory for recording or reading image data. The external I/F unit 712 is an interface for communicating with an external computer or the like. The timing signal or the like may be input from the outside of the equipment. Further, the equipment 700 may include a display device (a monitor, an electronic view finder, or the like) for displaying information obtained by the photoelectric conversion device. The equipment includes at least a photoelectric conversion device. Further, the equipment 700 includes at least one of an optical device, a control device, a processing device, a display device, a storage device, and a mechanical device that operates based on information obtained by the photoelectric conversion device. The mechanical device is a movable unit (for example, a robot arm) that operates upon receipt of a signal from the photoelectric conversion device.

Each pixel may include a plurality of photoelectric conversion units (a first photoelectric conversion unit and a second photoelectric conversion unit). The signal processing unit 708 may be configured to process the pixel signal based on the charges generated in the first photoelectric conversion unit and the pixel signal based on the charges generated in the second photoelectric conversion unit, and to acquire distance information from the imaging device 701 to the object.

Eighth Embodiment

Figure 20A:
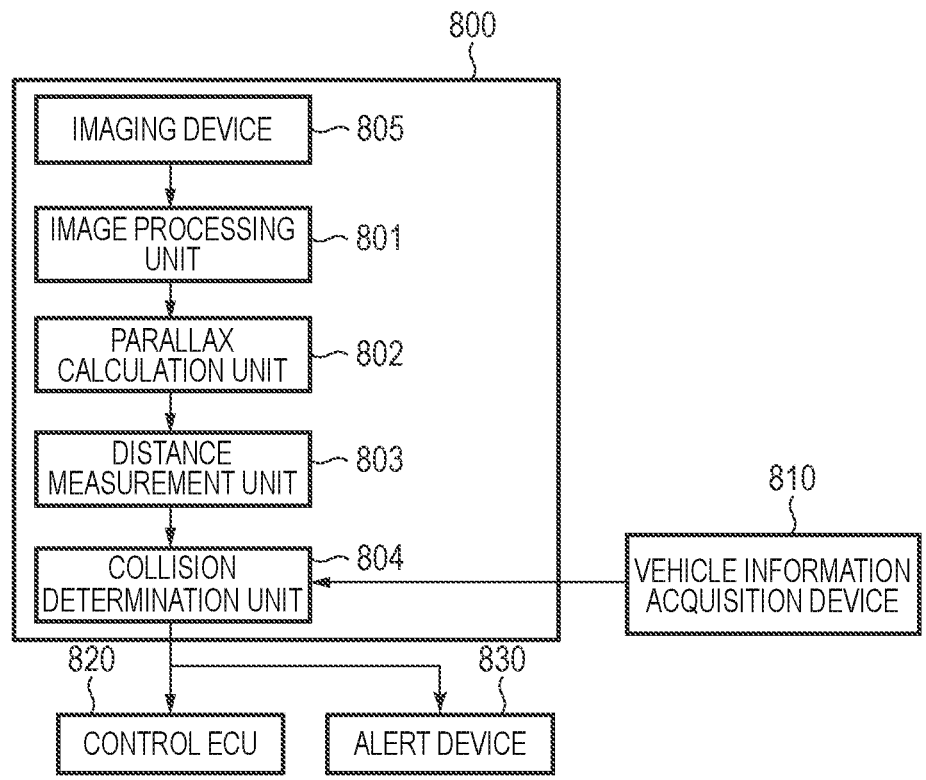
FIGS. 20A and 20B are block diagrams of equipment according to an eighth embodiment.
Figure 20B:
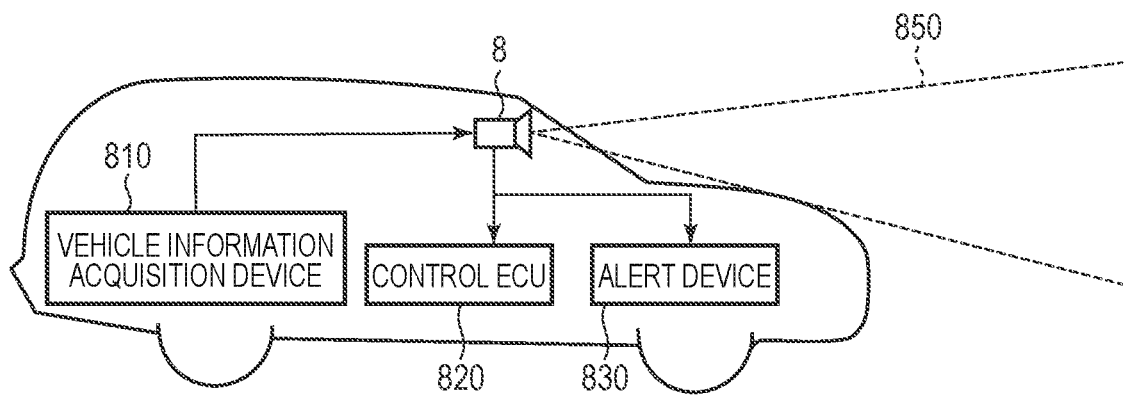

FIGS. 20A and 20B are block diagrams of equipment related to an in-vehicle camera according to the present embodiment. The equipment 800 includes an imaging device 805 (an example of a photoelectric conversion device) of the above-described embodiment and a signal processing device (processing device) that processes a signal from the imaging device 805. The equipment 800 includes an image processing unit 801 that performs image processing on a plurality of image data acquired by the imaging device 805, and a parallax calculation unit 802 that calculates parallax (phase difference of parallax images) from the plurality of image data acquired by the equipment 800. The equipment 800 includes a distance measurement unit 803 that calculates a distance to an object based on the calculated parallax, and a collision determination unit 804 that determines whether there is a possibility of collision based on the calculated distance. Here, the parallax calculation unit 802 and the distance measurement unit 803 are an example of a distance information acquisition means that acquires distance information to an object. That is, the distance information is information related to parallax, defocus amount, distance to an object, and the like. The collision determination unit 804 may determine the possibility of collision using any of the distance information. The distance information acquisition means may be realized by dedicatedly designed hardware, or may be realized by a software module. It may be realized by a field programmable gate array (FPGA), an application specific integrated circuit (ASIC) or a combination thereof.

The equipment 800 is connected to the vehicle information acquisition device 810, and can acquire vehicle information such as a vehicle speed, a yaw rate, and a steering angle. A control ECU 820, which is a control device that outputs a control signal for generating braking force to the vehicle based on the determination result of the collision determination unit 804, is connected to the equipment 800. The equipment 800 is also connected to an alert device 830 that issues an alarm to a driver based on the determination result of the collision determination unit 804. For example, when the possibility of collision is high as the determination result of the collision determination unit 804, the control ECU 820 performs vehicle control for avoiding collision or reducing damage by applying a brake, returning an accelerator, suppressing engine output, or the like. The alert device 830 alerts a user by sounding an alert such as a sound, displaying alert information on a screen of a car navigation system or the like, providing vibration to a seat belt or a steering wheel, or the like. The equipment 800 functions as control means for controlling the operation of controlling a vehicle as described above.

In the present embodiment, an image of the periphery of the vehicle, for example, the front or the rear is captured by the equipment 800. FIG. 20B illustrates equipment when capturing an image of the front of the vehicle (image capturing range 850). The vehicle information acquisition device 810 serving as an imaging control means sends an instruction to the equipment 800 or the imaging device 805 to perform an imaging operation. With such a configuration, the accuracy of distance measurement can be further improved.

Although the example of control for avoiding a collision to another vehicle has been described above, the embodiment is applicable to automatic driving control for following another vehicle, automatic driving control for not going out of a traffic lane, or the like. Furthermore, the equipment is not limited to a vehicle such as an automobile and can be applied to a movable body (movable apparatus) such as a ship, an airplane, a satellite, an industrial robot and a consumer use robot, or the like, for example. In addition, the equipment can be widely applied to equipment which utilizes object recognition or biometric authentication, such as an intelligent transportation system (ITS), a surveillance system, or the like without being limited to movable bodies.

Modified Embodiments

The present invention is not limited to the above-described embodiments, and various modifications are possible. For example, an example in which a configuration of a part of any embodiment is added to another embodiment or an example in which a configuration of a part of any embodiment is replaced with a part of another embodiment is also an embodiment of the present invention.

In the embodiment described above, it is assumed that the pixel array 2 and the analog peripheral circuit 7 are arranged in the same semiconductor substrate, but this is not necessary, and they may be arranged in different substrates. In this case, the photoelectric conversion device 1 may be a stacked type device in which a semiconductor substrate (first substrate) in which the pixel array 2 is arranged and a semiconductor substrate (second substrate) in which the analog peripheral circuit 7 is arranged are stacked. By arranging the readout circuit for in another substrate, a large area of the photoelectric conversion unit of the pixel array 2 can be secured. In this stacked type, the shift register 6 and the analog peripheral circuit 7 are preferably arranged on the same substrate. The analog peripheral circuit 7 often includes a digital circuit, and an increase in further manufacturing steps due to additional formation of the shift register 6 which is a digital circuit is small, so that the overall manufacturing cost can be reduced.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-099868, filed Jun. 16, 2021, which is hereby incorporated by reference herein in its entirety.

What is claimed is:

1. A photoelectric conversion device comprising:
a substrate;
a pixel array that includes a plurality of pixels forming a plurality of columns and is arranged in the substrate;
a plurality of first signal lines each transmitting a signal output from a pixel of a corresponding column;
an analog circuit arranged in the substrate and configured to process signals from the plurality of pixels;
a plurality of second signal lines transmitting signals from the plurality of pixels to the analog circuit on a column basis;
a switch configured to change a combination of connections between the plurality of first signal lines and the plurality of second signal lines; and
a shift register arranged in the substrate, including a flip-flop, and configured to control the switch,
wherein in a plan view with respect to the substrate, the shift register is arranged between the pixel array and the analog circuit, and
wherein in the plan view with respect to the substrate, the switch and the flip-flop are arranged in a direction different from a direction in which the plurality of first signal lines extend.

2. The photoelectric conversion device according to claim 1, wherein the switch is arranged in the substrate, and wherein in the plan view with respect to the substrate, the switch is arranged between the pixel array and the analog circuit.

3. The photoelectric conversion device according to claim 1, wherein the analog circuit includes a comparator configured to compare signals from the plurality of pixels with a reference signal.

4. The photoelectric conversion device according to claim 1, wherein each of the shift register and the analog circuit includes a semiconductor element having the same withstand voltage.

5. The photoelectric conversion device according to claim 1, wherein output signals of a flip-flop are input to a plurality of switches respectively corresponding to the plurality of first signal lines.

6. The photoelectric conversion device according to claim 5, wherein potentials of second signal lines connected respectively to the plurality of switches corresponding to the flip-flop can be averaged.

7. The photoelectric conversion device according to claim 1, wherein the number of the plurality of first signal lines is greater than the number of the plurality of second signal lines.

8. The photoelectric conversion device according to claim 1 further comprising an external terminal connected to one of the plurality of first signal lines,
wherein a first signal line connected to the external terminal is selected based on an output from the shift register.

9. The photoelectric conversion device according to claim 1,
wherein signals transmitted through two of the plurality of first signal lines are amplified by gains different from each other, and
wherein the switch is controlled such that a first signal line having a smaller gain of the two first signal lines and a second signal line causing a defect in an output signal are connected to each other.

10. The photoelectric conversion device according to claim 1, wherein the switch is controlled such that a combination of connections of the plurality of first signal lines and the plurality of second signal lines is changed for each horizontal scanning period in which one row of the pixel array is scanned.

11. The photoelectric conversion device according to claim 10, wherein a combination of connections between the plurality of first signal lines and the plurality of second signal lines is controlled based on a pseudo-random signal.

12. The photoelectric conversion device according to claim 1 further comprising a circuit configured to process a signal output from the analog circuit and arranged in another substrate different from the substrate,
wherein the substrate and the another substrate are stacked on each other.

13. A photoelectric conversion device comprising:
a pixel array that includes a plurality of pixels forming a plurality of columns;
a plurality of first signal lines each transmitting a signal output from a pixel of a corresponding column;
an analog circuit configured to process signals from the plurality of pixels;
a plurality of second signal lines transmitting signals from the plurality of pixels to the analog circuit on a column basis; and
a switch configured to change a combination of connections between the plurality of first signal lines and the plurality of second signal lines, wherein the switch is controlled such that a combination of connections of the plurality of first signal lines and the plurality of second signal lines is changed within a reading period of one frame.

14. The photoelectric conversion device according to claim 13, wherein the number of the plurality of first signal lines is the same as the number of the plurality of second signal lines.

15. The photoelectric conversion device according to claim 13, wherein the switch is controlled such that a combination of connections of the plurality of first signal lines and the plurality of second signal lines is changed for each horizontal scanning period in which one row of the pixel array is scanned.

16. The photoelectric conversion device according to claim 15, wherein a combination of connections between the plurality of first signal lines and the plurality of second signal lines is controlled based on a pseudo-random signal.

17. The photoelectric conversion device according to claim 13, wherein the switch is controlled such that a defective portion of the pixel array and a defective portion of the analog circuit are connected to each other.

18. The photoelectric conversion device according to claim 13,
wherein the pixel array is arranged in a first substrate, and
wherein the analog circuit is arranged in a second substrate stacked on the first substrate.

19. The photoelectric conversion device according to claim 1,
wherein the plurality of pixels are arranged to form a plurality of rows, and
wherein the plurality of first signal lines are configured to simultaneously read out signals from pixels in the plurality of rows.

20. Equipment comprising:
the photoelectric conversion device according to claim 1; and
at least any one of:
an optical device adapted for the photoelectric conversion device,
a control device configured to control the photoelectric conversion device,
a processing device configured to process a signal output from the photoelectric conversion device,
a display device configured to display information obtained by the photoelectric conversion device,
a storage device configured to store information obtained by the photoelectric conversion device, and
a mechanical device configured to operate based on information obtained by the photoelectric conversion device.

21. The equipment according to claim 20, wherein the processing device processes image signals generated by a plurality of photoelectric conversion units, respectively, and acquires distance information on a distance from the photoelectric conversion device to an object.

22. A method of driving a photoelectric conversion device,
the photoelectric conversion device including:
a substrate;
a pixel array that includes a plurality of pixels forming a plurality of columns and is arranged in the substrate;
a plurality of first signal lines each transmitting a signal output from a pixel of a corresponding column;
an analog circuit arranged in the substrate and configured to process signals from the plurality of pixels;
a plurality of second signal lines transmitting signals from the plurality of pixels to the analog circuit on a column basis;
a switch configured to change a combination of connections between the plurality of first signal lines and the plurality of second signal lines; and
a shift register arranged in the substrate and including a flip-flop,
wherein in a plan view with respect to the substrate, the shift register is arranged between the pixel array and the analog circuit, and wherein in the plan view with respect to the substrate, the switch and the flip-flop are arranged in a direction different from a direction in which the plurality of first signal lines extend,
the method comprising:
controlling the switch by the shift register to change a combination of connections of the plurality of first signal lines and the plurality of second signal lines.

23. A method of driving a photoelectric conversion device,
the photoelectric conversion device including:
a pixel array that includes a plurality of pixels forming a plurality of columns;
a plurality of first signal lines each transmitting a signal output from a pixel of a corresponding column;
an analog circuit configured to process signals from the plurality of pixels;
a plurality of second signal lines transmitting signals from the plurality of pixels to the analog circuit on a column basis; and
a switch configured to change a combination of connections between the plurality of first signal lines and the plurality of second signal lines,
the method comprising:
controlling the switch to change a combination of connections of the plurality of first signal lines and the plurality of second signal lines within a reading period of one frame.

* * * * *